US011534956B1

(12) United States Patent
Liang et al.

(10) Patent No.: US 11,534,956 B1
(45) Date of Patent: Dec. 27, 2022

(54) FILAMENT WINDING DEVICES

(71) Applicant: TAIYUAN UNIVERSITY OF TECHNOLOGY, Shanxi (CN)

(72) Inventors: Jianguo Liang, Taiyuan (CN); Xiaodong Zhao, Taiyuan (CN); Jianglin Liu, Taiyuan (CN); Hui Li, Taiyuan (CN); Junjie Guo, Taiyuan (CN); Haifeng Gao, Taiyuan (CN); Runtian Zhao, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 17/805,464

(22) Filed: Jun. 5, 2022

(30) Foreign Application Priority Data

Jun. 7, 2021 (CN) .......................... 202110633523.X

(51) Int. Cl.
*B29C 53/00* (2006.01)
*B29C 53/64* (2006.01)
*B29C 53/60* (2006.01)
*B29L 31/00* (2006.01)

(52) U.S. Cl.
CPC ............ *B29C 53/64* (2013.01); *B29C 53/602* (2013.01); *B29L 2031/7156* (2013.01)

(58) Field of Classification Search
CPC ..... B29C 53/582; B29C 53/602; B29C 53/64; B29C 53/665; B29C 53/70
See application file for complete search history.

(56) References Cited

U.S. PATENT DOCUMENTS

| 4,029,265 | A | 6/1977 | Piper |
| 2002/0139430 | A1 | 10/2002 | Amano et al. |
| 2009/0065622 | A1 | 3/2009 | Uozumi et al. |
| 2012/0315569 | A1 | 12/2012 | Tanigawa et al. |
| 2015/0053808 | A1 | 2/2015 | Tanigawa et al. |
| 2015/0290882 | A1* | 10/2015 | Hatta ...................... B29C 70/16 156/441 |
| 2022/0112046 | A1* | 4/2022 | Ikezaki ................... B29C 53/64 |

FOREIGN PATENT DOCUMENTS

| CN | 1666944 | A | 9/2005 |
| CN | 1861370 | A | 11/2006 |
| CN | 102548740 | A | 7/2012 |
| CN | 103118861 | A | 5/2013 |
| CN | 103153590 | A * | 6/2013 | ......... B29C 53/8016 |
| CN | 203093035 | U | 7/2013 |

(Continued)

OTHER PUBLICATIONS

First Office Action in Chinese Application No. 202110633523.X dated Feb. 8, 2022, 24 pages.

(Continued)

*Primary Examiner* — Emmanuel M Marcelo
(74) *Attorney, Agent, or Firm* — Metis IP LLC

(57) ABSTRACT

The present disclosure provides a filament winding device, which includes a helical winding device, a circumferential winding device, and a fixing device, a workpiece is clamped through the fixing device that drives the workpiece to rotate radially and move axially, the workpiece is performed helical winding through the helical winding device, and the workpiece is performed circumferential winding through the circumferential winding device.

9 Claims, 22 Drawing Sheets

(56) References Cited

FOREIGN PATENT DOCUMENTS

| | | | | |
|---|---|---|---|---|
| CN | 104684712 A | * | 6/2015 | ........... B29C 53/602 |
| CN | 206201468 U | | 5/2017 | |
| CN | 112203832 A | | 1/2021 | |
| EP | 3912945 A1 | * | 11/2021 | ............. B29C 53/00 |
| KR | 20210006444 A | * | 1/2021 | ........... B29C 53/582 |

OTHER PUBLICATIONS

Decision to Grant a Patent in Chinese Application No. 202110633523.X dated Mar. 11, 2022, 4 pages.

\* cited by examiner

FILAMENT WINDING DEVICES

CROSS-REFERENCE TO RELATED APPLICATIONS

This application claims priority to Chinese Patent Application No. 202110633523.X filed on Jun. 7, 2021, the contents of which are hereby incorporated by reference to its entirety.

TECHNICAL FIELD

The present disclosure relates to the field of filament winding technology, and in particular, to filament winding devices.

BACKGROUND

After years of development, pressure vessels have been widely used in aerospace, medical care, and the daily resident lives. With continuous emergence of new materials and new technology, the pressure vessels are developing in lightweight and high-intensity directions. Filament winding is one of important links in the molding process of the pressure vessels. Winding efficiency and winding quality directly determine production efficiency, performance, and life of components such as the pressure vessels.

Therefore, it is desirable to provide filament winding devices to improve the winding efficiency and the winding quality.

SUMMARY

One aspect of some embodiments of the present disclosure provides a filament winding device. The device includes a helical winding device, a circumferential winding device, and a fixing device, a workpiece is clamped through the fixing device that drives the workpiece to rotate radially and move axially, the workpiece on the fixing device is performed helical winding through the helical winding device, and the workpiece on the fixing device is performed circumferential winding through the circumferential winding device. The helical winding device includes a frame body and a plurality of multi-filar guides, the frame body is provided with a second through-hole, the plurality of multi-filar guides distributed in a circumference along a center of the second through-hole are rotationally connected to the frame body, and filament is extended out from each multi-filar guide in the plurality of multi-filar guides. The frame body is provided with a first driving mechanism that drives each multi-filar guide to rotate. Each multi-filar guide is rotationally connected to the frame body through a coupling sleeve, the coupling sleeve is rotationally connected to the frame body, and each multi-filar guide is slidably connected to the coupling sleeve. The first driving mechanism is connected to the coupling sleeve to drive each multi-filar guide to rotate. The helical winding device further includes a telescopic mechanism that drives each multi-filar guide to slide along the coupling sleeve. The circumferential winding device includes a frame, a fixing plate, a plurality of filament bundle cylinders, a bundle collecting device, and a guidewire component, the fixing plate is rotationally connected to the frame, and the fixing plate is connected to a driving element that drives the fixing plate to rotate. Each filament bundle cylinder in the plurality of the filament bundle cylinders corresponds to a tension controller. A middle part of the fixing plate is provided with a first through-hole, each filament bundle cylinder distributed in a circumference along a center of the first through-hole is rotationally connected to the fixing plate, and each tension controller is fixedly connected to the fixing plate. The fixing plate is provided with a plurality of winding rollers, each winding roller in the plurality of winding rollers is located outside of each filament bundle cylinder, and each winding roller distributed in a circumference along the center of the first through-hole is rotationally connected to the fixing plate. The bundle collecting device and the guidewire component are fixed on the fixing plate, filament bundle wound on each filament bundle cylinder is extended out from the guidewire component after passing through a corresponding tension controller and a corresponding winding roller successively and converging by the bundle collecting device.

In some embodiments, the bundle collecting device may include a bracket and a guide plate, one end of the bracket may be fixedly connected to the fixing plate and other end of the bracket may be fixedly connected to the guide plate, two ends of the guide plate may be provided with guide gears respectively, an upper end of the guide plate may be fixedly provided with a transition plate, which may be provided with transition gears; and the filament extend from the guidewire component after passing through the transition gears and the guide gears successively.

In some embodiments, the guidewire component may include a guidewire frame and a pressure head, the guidewire frame may be fixedly connected to the fixing plate, the pressure head may be fixedly connected to the guidewire frame, and the filament bundle may be extended out from a gap between the pressure head and the guidewire frame.

In some embodiments, each multi-filar guide may be a hollow rod with two openings at both ends, the filament may enter the hollow rod from an opening at one end and extend out from an opening at other end, a shape of the other end of the hollow rod may be flat, and a shape of the other end may be the same as a cross-section shape of the filament.

In some embodiments, the first driving mechanism may include a first driving element and a first gear transmission mechanism, and the first driving element may be connected to each multi-filar guide through the first gear transmission mechanism to drive each multi-filar guide to rotate.

In some embodiments, the first gear transmission mechanism may include a first gear ring and a plurality of first connecting columns, the first gear ring may be rotationally connected to the frame body, the first driving element may be connected to the first gear ring to drive the first gear ring to rotate, the plurality of first connecting columns may be rotationally connected to the frame body, each multi-filar guide may be connected to a first connecting column in the plurality of first connecting columns, the first connecting column may be driven to rotate through rotation of the first gear ring, the first connecting column may drive the multi-filar guide to rotate, one end of the first connecting column may be provided with a first connecting gear meshing with the first gear ring, and other end of the first connecting column may be provided with a first transmission gear meshing with a first driving gear on the multi-filar guide.

In some embodiments, the telescopic mechanism may include a plurality of shifting fork mechanisms and a second driving mechanism, each multi-filar guide may be connected to a shifting fork mechanism in the plurality of shifting fork mechanisms, the shifting fork mechanism may include a shifting fork and a guide rod, the guide rod may be fixedly connected to the frame body, the shifting fork may be slidably connected to the guide rod, one end of the shifting fork may be rotationally connected to the multi-filar guide, and the second driving mechanism may be connected to the shifting fork to drive the shifting fork to slide along the guide rod.

In some embodiments, the second driving mechanism may include a second driving element, a second gear transmission mechanism, and a plurality of lead screw and nut mechanisms, each shifting fork may be connected to a lead screw and nut mechanism, one end of lead screw in the lead screw and nut mechanism may be fixedly connected to the shifting fork, and nut in the lead screw and nut mechanism may be rotationally connected to the frame body, the second gear transmission mechanism may include a second gear ring and a plurality of second connecting columns, the second gear ring may be rotationally connected to the frame body, the second gear ring is driven to rotate by the second driving element, the plurality of second connecting columns may be rotationally connected to the frame body, each lead screw and nut mechanism may be connected to a second connecting column in the plurality of second connecting columns, the second connecting column may be driven to rotate through the rotation of the second gear ring, the second connecting column may drive the multi-filar guide to expand and contract, one end of the second connecting column may be provided with a second connecting gear meshing with the second gear ring, and other end of the second connecting column may be provided with a second transmission gear meshing with outer gears of the nut.

In some embodiments, the fixing device may include a clamper and a movable seat, the clamper may be rotationally connected to the movable seat, the movable seat may be provided with a rotating motor connected to the clamper, the clamper may be driven to rotate through the rotating motor, and a bottom of the movable seat may be provided with a movable mechanism that drives the movable seat to move.

BRIEF DESCRIPTION OF THE DRAWINGS

The present disclosure may be further explained by the exemplary embodiments, and these exemplary embodiments may be described in detail through drawings. These embodiments are not restricted, in these embodiments, the same number indicates the same structure, wherein.

DETAILED DESCRIPTION

Figure 1:
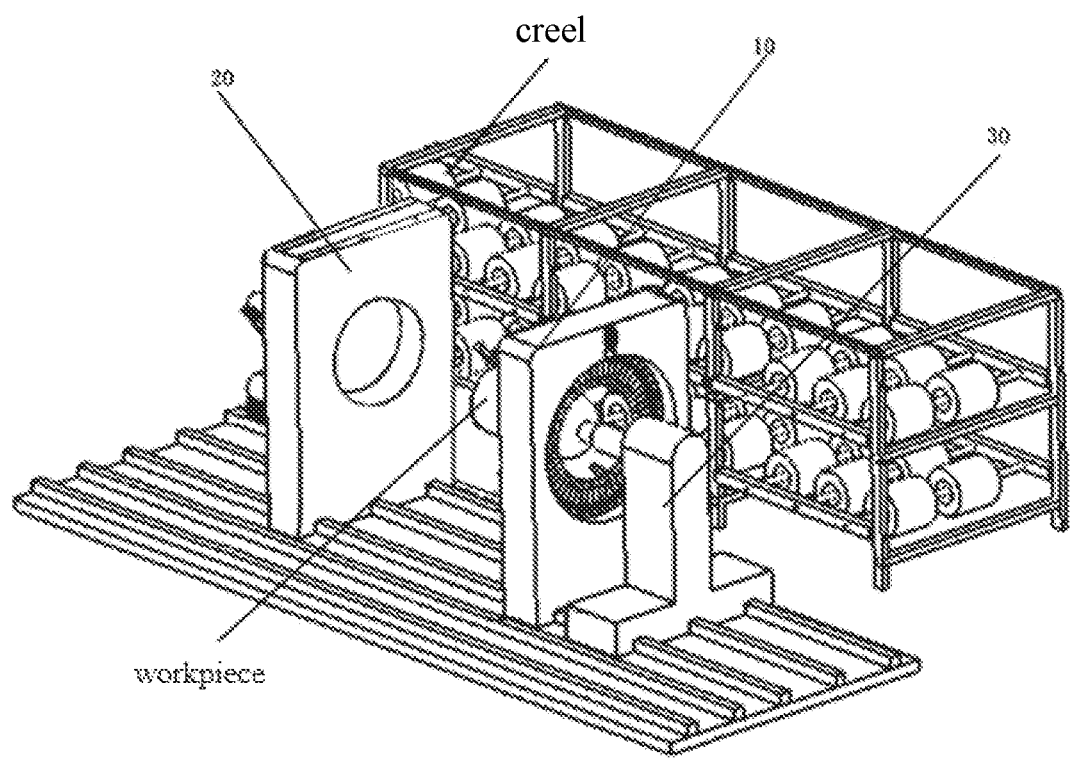
FIG. 1 is a structural diagram of a filament winding device according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the present disclosure, and those skilled in the art may apply this present disclosure to other similar situations based on these drawings and on the premise of not paying creative labor. Unless obviously obtained from the context or the context illustrates otherwise, the same numeral in the drawings refers to the same structure or operation.

It should be understood that "systems", "devices", "units", and/or "modules" used herein are a method for distinguishing different components, elements, components, parts, or assemblies of different levels. However, if other words may achieve the same purpose, the words may be replaced by other expressions.

As shown in the present disclosure and the claims, unless the context clearly suggests exceptional circumstances, the words "a", "an" and/or "the" do not specifically refer to the singular, but also include the plural. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to some embodiments of the present disclosure. It should be understood that the previous or back operations may not be accurately implemented in order. Conversely, the operations may be implemented in an inverted order, or simultaneously.

At the same time, other operations may also be added to these processes, or a certain step or several steps may be removed from these processes.

During the molding process of pressure vessels, the filament winding process is one of the important links. The filament winding process is to lead out filament bundle from a multi-filar guide, and fix the filament bundle winding on a surface of a workpiece to be wound (or referred to as a workpiece).

FIG. 1 is a structural diagram of a filament winding device according to some embodiments of the present disclosure.

As shown in FIG. 1, in some embodiments, a filament winding device may include a helical winding device 10, a circumferential winding device 20, and a fixing device 30, a workpiece may be clamped through the fixing device 30 that drives the workpiece to rotate radially and move axially, the workpiece on the fixing device 30 may be performed helical winding through the helical winding device 10, and the workpiece on the fixing device 30 may be performed circumferential winding through the circumferential winding device 20.

The helical winding device 10 may be used to perform helical winding on the workpiece, and the workpiece may be the workpiece to be wound, such as pressure vessels, pipes, cylinders, etc.

The circumferential winding device 20 may be used to perform circumferential winding on the workpiece.

The fixing device 30 may be used to fix the workpiece, for example, a fixing clip, a fixing plate, etc.

Figure 2:
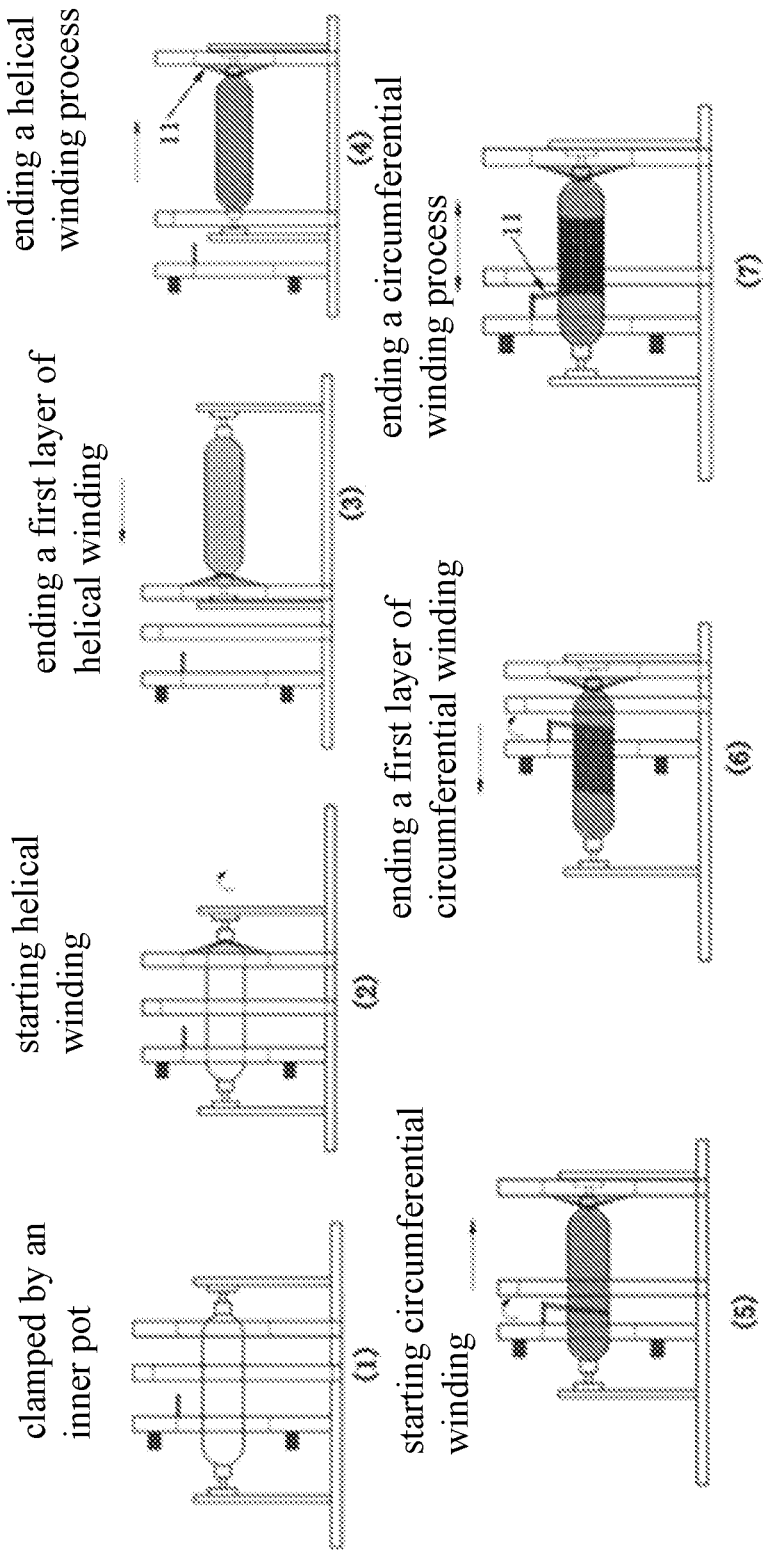
FIG. 2 is a schematic diagram illustrating a winding process of the filament winding device according to some embodiments of the present disclosure.

FIG. 2 is a schematic diagram illustrating a winding process of the filament winding device according to some embodiments of the present disclosure.

As shown in FIG. 2, in some embodiments, when the filament winding device is used, the workpiece (the workpiece to be wound) may be placed on the fixing device 30, and then helical winding may be performed on the surface of the workpiece by the helical winding device 10, and then circumferential winding may be performed on the surface of the workpiece by the circumferential winding device 20. In some embodiments, when the filament winding device is used, the circumferential winding may be performed on the surface of the workpiece by the circumferential winding device 20 firstly, and then the helical winding may be performed on the surface of the workpiece by the helical winding device 10. Alternatively, cross-winding may be performed on the surface of the workpiece, that is, a circle of the circumferential winding may be performed again after performing a circle of the helical winding or a circle of the helical winding may be performed again after performing a circle of the circumferential winding, and so on.

Figure 3:
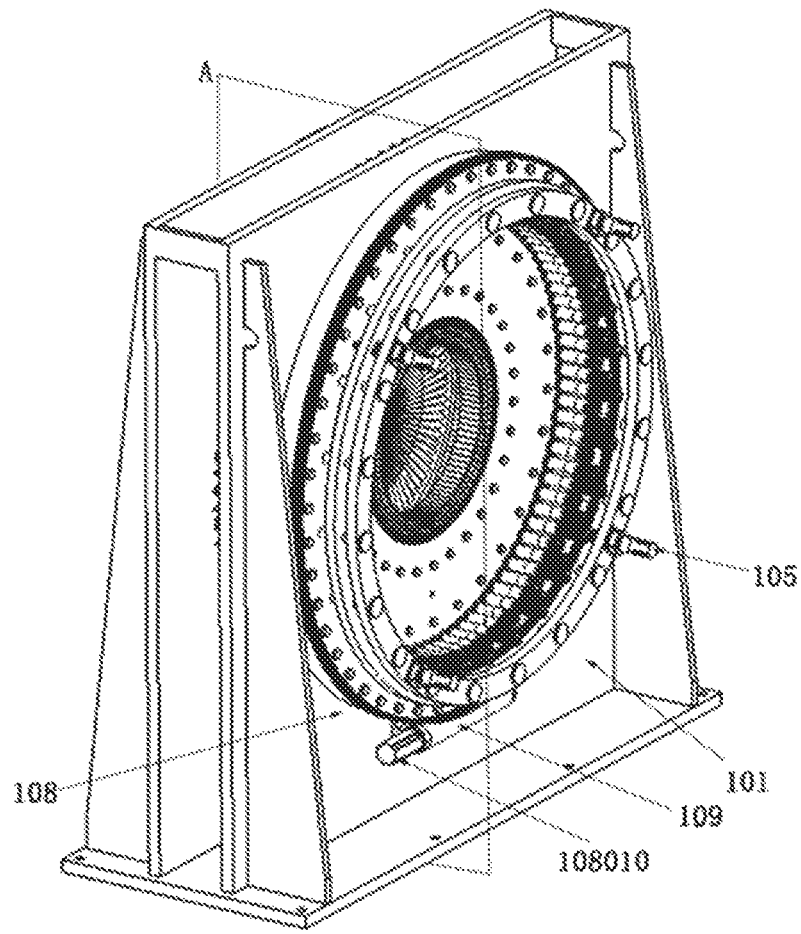
FIG. 3 is an axonometric view of a helical winding device in one direction according to some embodiments of the present disclosure.

FIG. 3 is an axonometric view of a helical winding device in one direction according to some embodiments of the present disclosure.

Figure 4:
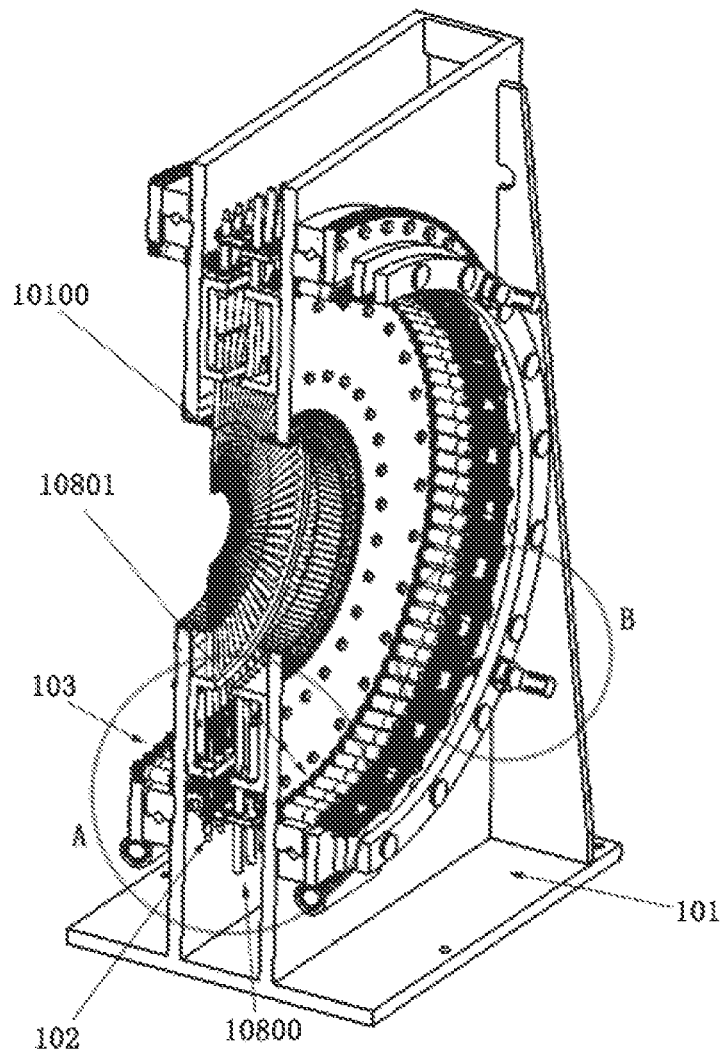
FIG. 4 is a sectional view of plane A in FIG. 3 according to some embodiments of the present disclosure.

FIG. 4 is a sectional view of plane A in FIG. 3 according to some embodiments of the present disclosure.

As shown in FIG. 4, in some embodiments, the helical winding device 10 may include a frame body 101 and a plurality of multi-filar guides 102, the frame body 101 may be provided with a second through-hole 10100, the plurality of multi-filar guides 102 distributed in a circumference along a center of the second through-hole 10100 may be rotationally connected to the frame body 101, filament may be extended out from each multi-filar guide in the plurality of multi-filar guides 102, and the frame body 101 may be provided with a first driving mechanism 103 that drives each multi-filar guide 102 to rotate.

In some embodiments, the plurality of multi-filar guides 102 distributed in the circumference along the center of the second through-hole 10100 may be rotationally connected to the frame body 101, the filament may be extended out from each multi-filar guide in the plurality of multi-filar guides 102, the extended filament may be evenly distributed on outer surface of the pressure vessel in a helical shape. The first driving mechanism 103 may drive each multi-filar guide 102 to rotate to change an angle of the filament to complete winding via rotation and axial movement of the pressure vessel. When the helical winding device is used to wind, it may ensure that the filaments are evenly distributed and no overlapping or crossing between the filaments. Thus, while ensuring the winding efficiency, it may effectively reduce the use of the filaments.

The frame body may be used to support, connect, and fix components. In some embodiments, the frame body may be provided with a through-hole.

The multi-filar guides may be a component used to drag the filaments. The filaments may include glass filaments, carbon filaments, polyamide filaments, etc. The multi-filar guides may adopt a variety of structural designs. As shown in FIG. 4, in some embodiments, each multi-filar guide 102 may be a hollow rod with two openings at both ends, the filament may enter the hollow rod from an opening at one end and extend from an opening at other end, a shape of the other end of the hollow rod may be flat, and a shape of the other end may be the same as a cross-section shape of the filament. The flat shape of the opening at the other end may prevent deformation of the multiple filament bundles in the plurality of multi-filar guides. The shape of the opening at the other end is the same as the cross-section shape of the filament, which may ensure that the filaments pass smoothly and the filaments are driven to rotate. The cross-section shape of the common filament is rectangular, so the shape of the opening at the other end is also rectangular. Through the structural design, the filaments may be driven to rotate correspondingly while the plurality of multi-filar guides rotate. A gap between the opening at the other end and the filaments may ensure that the filament may pass through. Of course, a smaller gap may be designed on premise of ensuring the filaments pass through.

As shown in FIG. 4, in some embodiments, when helical winding using the filament winding device, the workpiece to be wound may passes through the second through-hole 10100 on the frame body 101, a plurality of filament bundles may be extended out from a creel and tension may be controlled by an existing tension controller, each filament bundle may pass through a corresponding multi-filar guide 102, a single filament bundle extended out from each multi-filar guides 102 may gather into multiple filament bundles and the multi-filament may be evenly distributed on the surface of the workpiece, and no overlapping or crossing between the filaments. Then, the multi-filament bundles may be helically wound on the surface of the workpiece simultaneously by rotation and movement of the workpiece and the rotation of each multi-filar guide 102.

The tension controller (e.g., a mechanical tension controller, an electronic tension controller, etc.) may be used to regulate winding tension of the filament bundle.

In some embodiments, the multi-filar guide 102 may be designed as a telescopic structure, which may be expanded or contracted according to a profile change of a shape of a real-time winding of the workpiece (e.g., an inner pot of the pressure vessel), so as to ensure that the filament may well fit an outer surface of the workpiece to further improve the winding effect.

Figure 5:
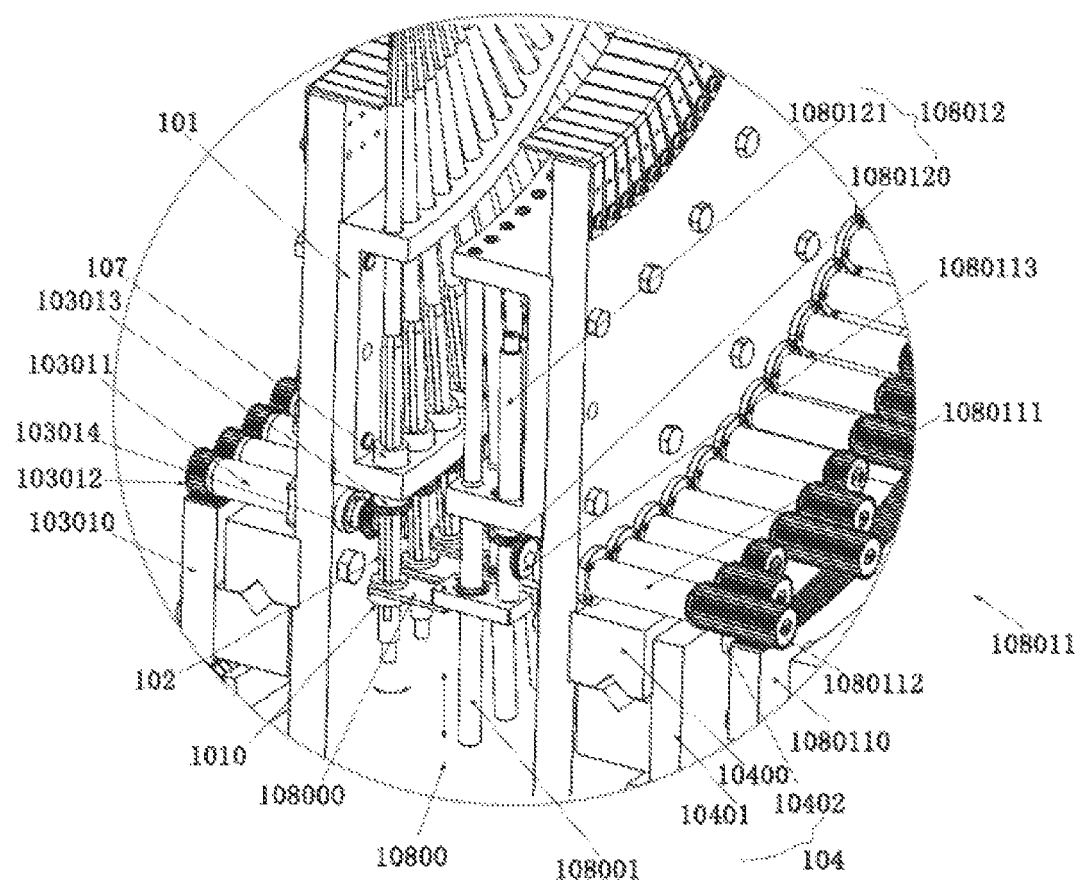
FIG. 5 is a partial enlarged view of part A in FIG. 4 according to some embodiments of the present disclosure.

FIG. 5 is a partial enlarged view of part A in FIG. 4 according to some embodiments of the present disclosure.

As shown in FIG. 5, in some embodiments, each multi-filar guide 102 may be rotationally connected to the frame body 101 through a coupling sleeve 107, the coupling sleeve 107 may be rotationally connected to the frame body 101, and each multi-filar guide 102 may be slidably connected to the coupling sleeve 107, and the first driving mechanism 103 may be connected to the coupling sleeve 107 to drive the multi-filar guide 102 to rotate. In some embodiments, the filament winding device may further include a telescopic mechanism 108 that drives each multi-filar guide 102 to slide along the coupling sleeve 107. Therefore, the multi-filar guides 102 may not only rotate but also expand or contract, which may control the multi-filar guide 102 to expand and contract according to the profile change of the shape of the real-time winding of the pressure vessel, so as to ensure that the filament may well fit the pressure vessel to improve the winding effect.

The coupling sleeve may refer to a sleeve-shaped component used to connect two components, for example, a rebar straight thread coupling sleeve, a driving shaft coupling sleeve, a wire coupling sleeve, etc. The coupling sleeve and the multi-filar guide may be set with a variety of structures. In some embodiments, the coupling sleeve 107 may be provided with a protrusion, the multi-filar guides 102 may be provided with a corresponding keyway, which realizes sliding by combination of the keyway and the protrusion. In some embodiments, an inner hole of the coupling sleeve 107 may be set as a prismatic shape and an outside of the multi-filar guide 102 may also be set as a prismatic to achieve sliding.

Figure 6:
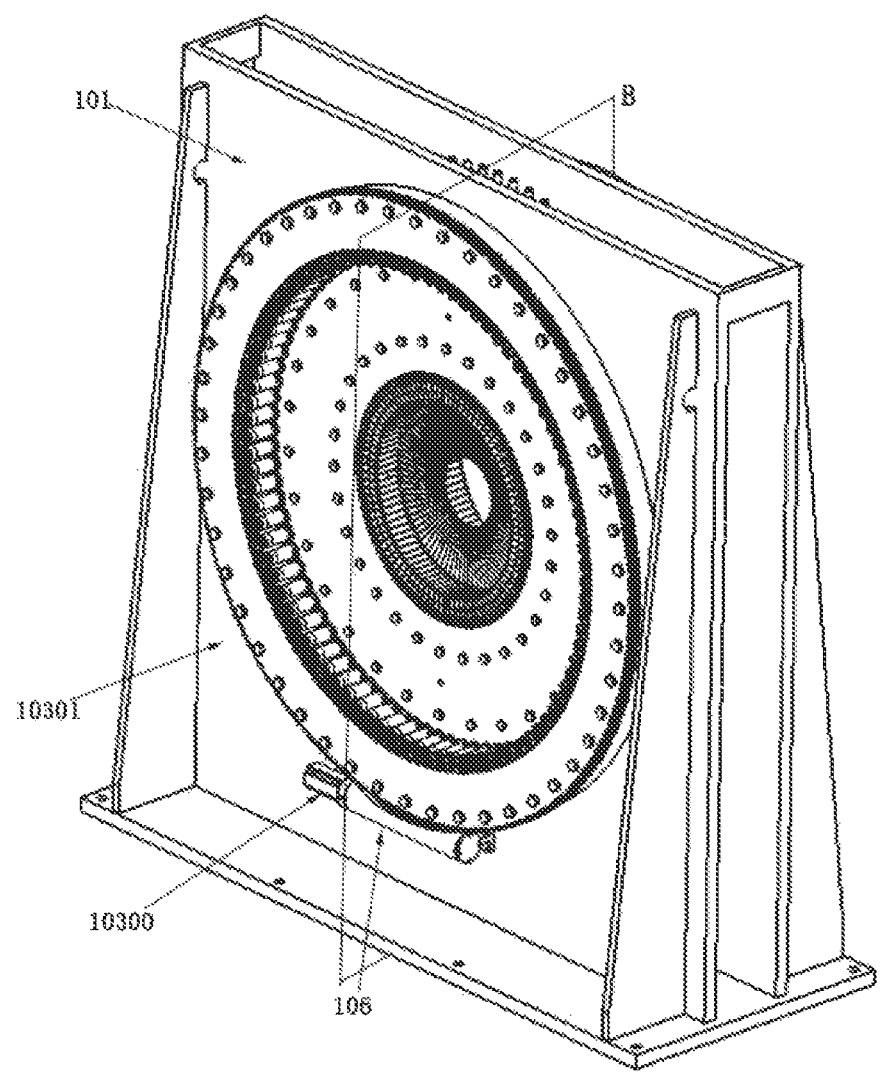
FIG. 6 is an axonometric view of the helical winding device in another direction according to some embodiments of the present disclosure.

FIG. 6 is an axonometric view of the helical winding device in another direction according to some embodiments of the present disclosure.

The first driving mechanism may be used to drive a component to rotate. As shown in FIG. 6, in some embodiments, the first driving mechanism 103 may include a first driving element 10300 and a first gear transmission mechanism 10301, the first driving element 10300 may be connected to each multi-filar guide 102 through the first gear transmission mechanism 10301 to drive each multi-filar guide 102 to rotate. More descriptions regarding the multi-filar guide 102 may be found elsewhere in the present disclosure, e.g., FIG. 4 and its relevant descriptions thereof.

The first driving element may be a common element for driving, for example, a servo motor, a hydraulic motor, etc.

The first gear transmission mechanism may be a mechanism for transmission using gears, for example, a reducer gearbox, a gear transmission, etc. The structure settings of the first gear transmission mechanism 10301 may drive all multi-filar guides to rotate, the structure of which is simple and the settings of which are reasonable.

In some embodiments, each multi-filar guide 102 may be ensured to rotate stably and accurately through a way of gear transmission.

Figure 7:
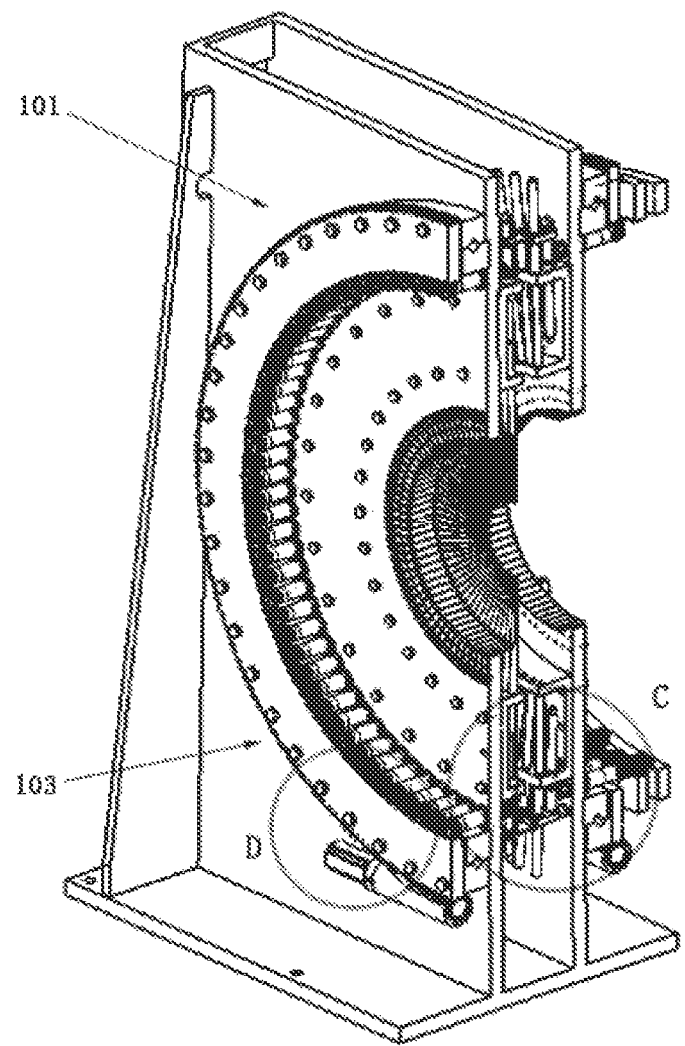
FIG. 7 is a sectional view of plane B in FIG. 6 according to some embodiments of the present disclosure.

FIG. 7 is a sectional view of plane B in FIG. 6 according to some embodiments of the present disclosure.

Figure 8:
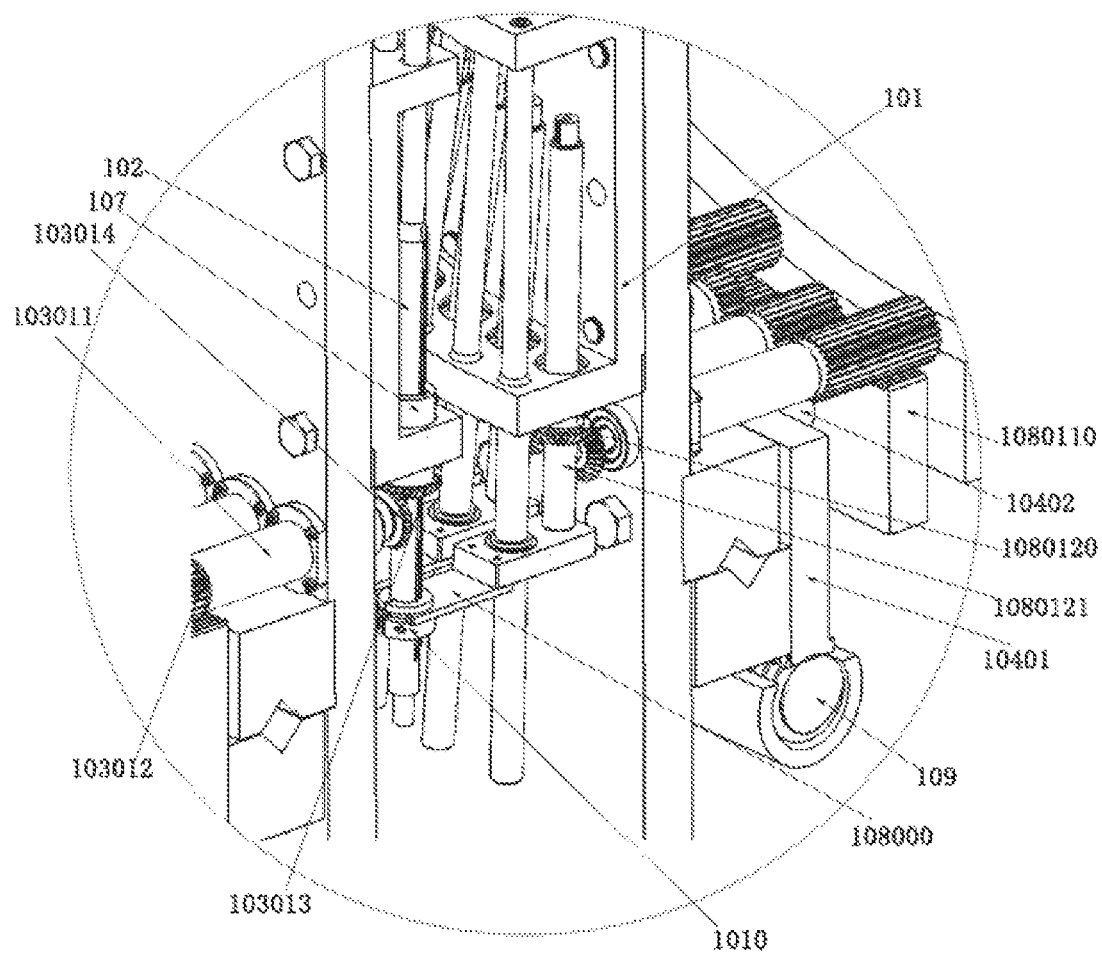
FIG. 8 is a partial enlarged view of part C in FIG. 7 according to some embodiments of the present disclosure.

FIG. 8 is a partial enlarged view of part C in FIG. 7 according to some embodiments of the present disclosure.

Figure 9:
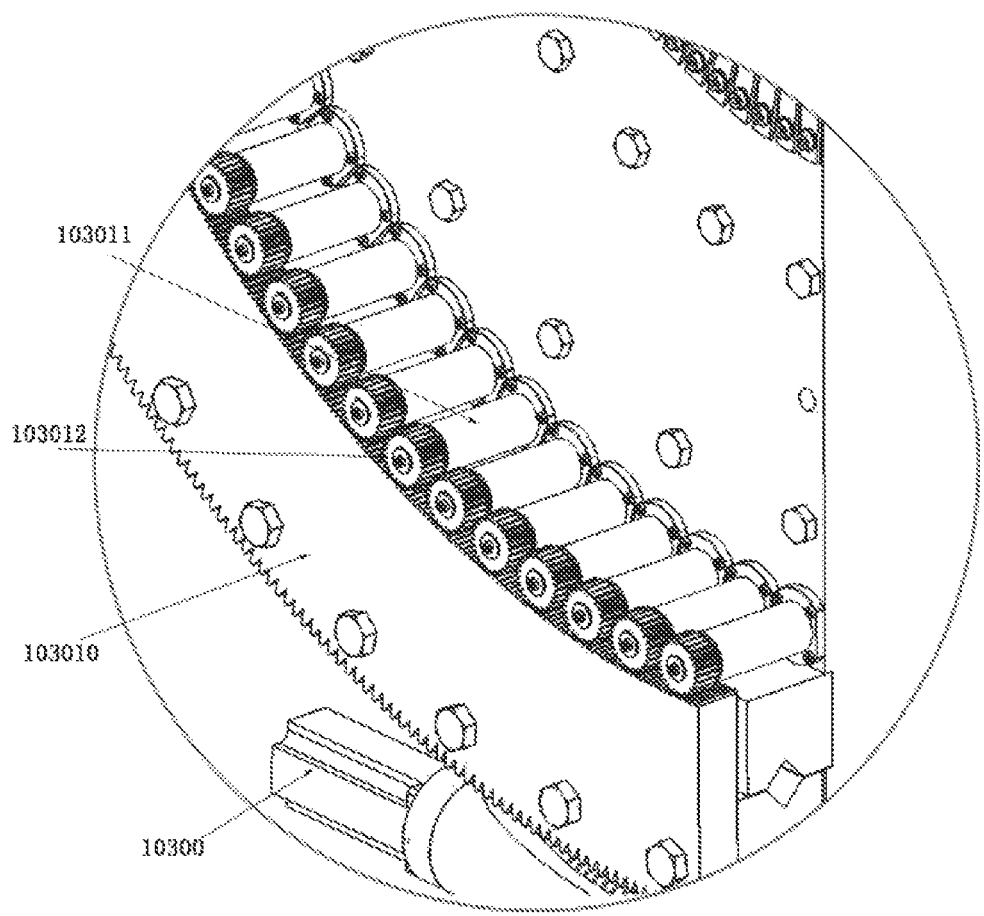
FIG. 9 is a partial enlarged view of part D in FIG. 7 according to some embodiments of the present disclosure.

FIG. 9 is a partial enlarged view of part D in FIG. 7 according to some embodiments of the present disclosure.

As shown in FIG. 9, in some embodiments, the first transmission mechanism 10301 may include a first gear ring 103010 and a plurality of first connecting columns 103011. More descriptions regarding the first gear transmission mechanism 10301 may be found elsewhere in the present disclosure, e.g., FIG. 6 and its relevant descriptions thereof.

The first gear ring may be used for meshing with the gears to drive rotation. As shown in FIG. 9, in some embodiments, the first gear ring 103010 may be a double gear ring, inner gears of which may be meshed with the first connecting gear 103012, and the first driving element 10300 may be meshed with outer gears of the double gear ring through a first worm 106 or gears. The first worm 106 may be rotationally connected to the frame body 101. More descriptions regarding the first worm 106 may be found elsewhere in the present disclosure, e.g., FIG. 6 and its relevant descriptions thereof.

The first connecting gear may be a component that connects to components by meshing. In some embodiments, the first connecting gear 103012 may be meshed with the inner gears of the double gear ring of the first gear ring 103010.

The first worm may achieve transmission between the two intersecting axes using gears or other similar elements. In some embodiments, the first worm 106 may be meshed with the outer gears of the double gear ring of the first gear ring 103010.

As shown in FIG. 9, in some embodiments, the first gear ring 103010 may be rotationally connected to the frame body 101, and the first driving element 10300 may be connected to the first gear ring 103010 to drive the first gear ring 103010 to rotate.

The first connecting column may be a cylindrical element used to connect two components. As shown in FIG. 8, in some embodiments, a plurality of first connecting column may be rotationally connected to the frame body 101, and each multi-filar guide 102 may be connected to a first connecting column 103011 in the plurality of first connecting columns.

As shown in FIG. 8, in some embodiments, the first connecting column 103011 may be driven to rotate through rotation of the first gear ring 103010, the first connecting column 103011 may drive the multi-filar guide 102 to rotate, and one end of the first connecting column 103011 may be provided with a first connecting gear 103012 meshing with the first gear ring 103010, and other end of the first connecting column 103011 may be provided with a first transmission gear 103014 meshing with a first driving gear 103013 on the multi-filar guide 102. More descriptions regarding the first gear ring 103010 may be found elsewhere in the present disclosure, e.g., FIG. 9 and its relevant descriptions thereof.

The first transmission gear may be transmitted by gear meshing. In some embodiments, the multi-filar guide 102 may be driven to rotate through the first driving gear 103013 on the multi-filar guide 102 meshing with the first transmission gear 103014 on the first connecting column 103011.

The first driving gear may drive the components to rotate using gears meshing. In some embodiments, the first driving gear 103013 on the multi-filar guide 102 may drive the multi-filar guide 102 to rotate by meshing with the first transmission gear 103014 on the first connecting column 103011.

As shown in FIG. 8, in some embodiments, when rotating, the first gear ring 103010 may drive the first connecting column 103011 to rotate by meshing with the first connecting gear 103012 at one end of the first connecting column 103011, the rotation of the first connecting column 103011 may drive the multi-filar guide 102 to rotate through the first transmission gear 103014 at the other end of the first connecting column 103011 meshing with the first driving gear 103013 arranged on the multi-filar guide 102. Therefore, when rotating, the first gear ring 103010 may drive all the multi-filar guides to rotate. More descriptions regarding the first gear ring 103010 may be found elsewhere in the present disclosure, e.g., FIG. 9 and its relevant descriptions thereof.

Figure 10:
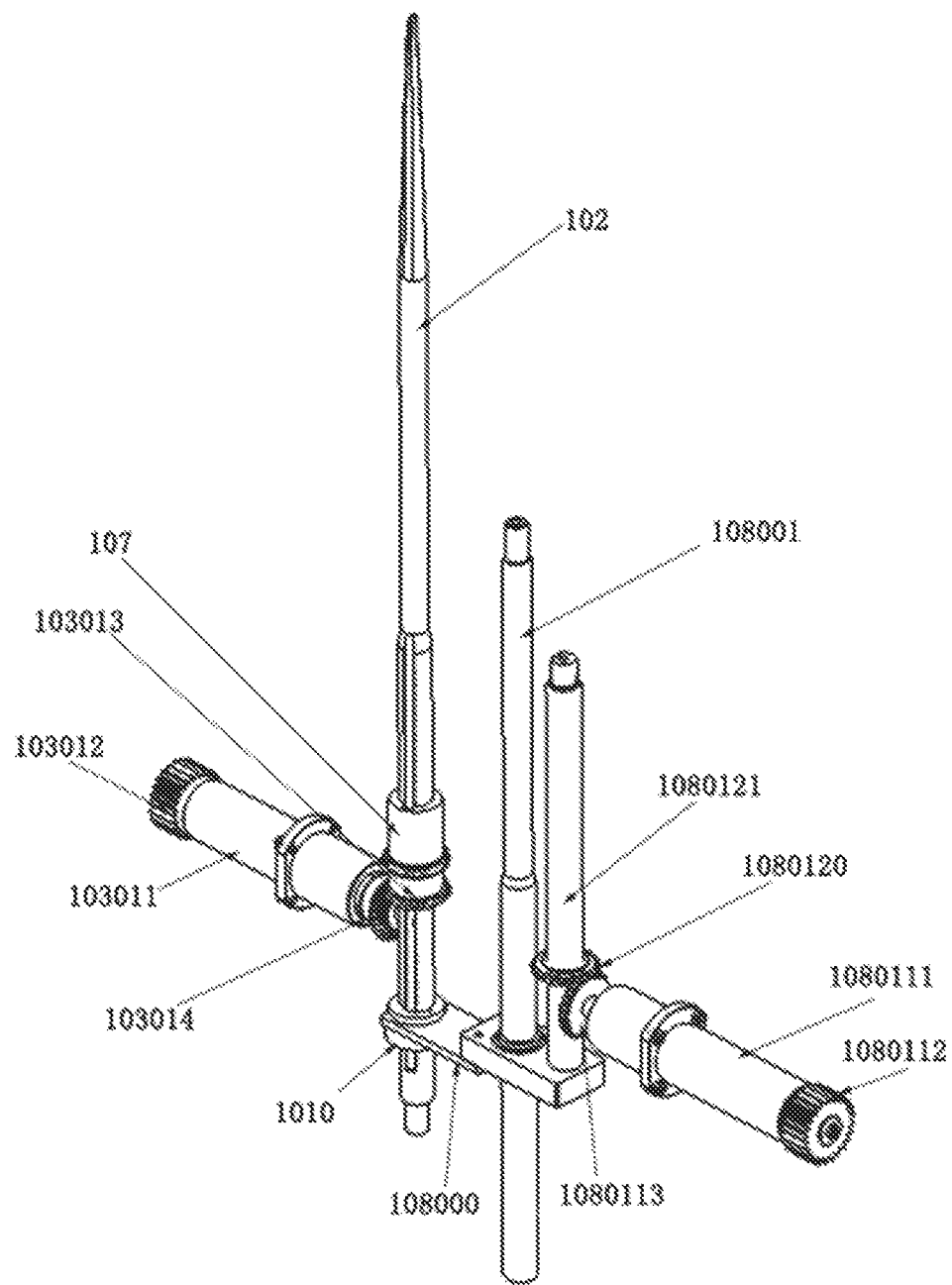
FIG. 10 is a structural diagram of a shifting fork mechanism according to some embodiments of the present disclosure.

FIG. 10 is a structural diagram of a shifting fork mechanism according to some embodiments of the present disclosure.

The telescopic mechanism may refer to a mechanism that may achieve a function of expansion and contraction. As shown in FIG. 4, in some embodiments, the telescopic mechanism may be implemented with a plurality of structures, which may achieve the expansion and contraction of the multi-filar guide 102. For example, a plurality of telescopic cylinders may be set to drive the multi-filar guide 102 to expand and contract through the expansion and contraction of the telescopic cylinders. In some embodiments, the telescopic mechanism 108 may include a plurality of shifting fork mechanisms 10800 and a second driving mechanism 10801, and each multi-filar guide 102 may be connected to a shifting fork mechanism 10800. More descriptions regarding the telescopic mechanism 108 may be found elsewhere in the present disclosure, e.g., FIG. 3 and its relevant descriptions thereof. Each multi-filar guide may be driven to slide along the coupling sleeve through the telescopic mechanism, so that the multi-filar guide may not only rotate but also expand and contract, the multi-filar guide may control the multi-filar guide to expand and contract according to the profile change of the shape of the real-time winding of the pressure vessel, thereby causing that the filament may well fit the pressure vessel to improve the winding effect.

The shifting fork mechanisms may be used to control the movement of the multi-filar guide. As shown in FIG. 10, in some embodiments, the shifting fork mechanism 10800 may include a shifting fork 108000 and a guide rod 108001, the guide rod 108001 may be fixedly connected to the frame body 101, and the shifting fork 108000 may be slidably connected to the guide rod 108001, an end of the shifting fork 108000 may be rotationally connected to the multi-filar guide 102, and the second driving mechanism 10801 may be connected to the shifting fork 108000 to drive the shifting fork 108000 to slide along the guide rod 108001. More descriptions regarding the shifting fork mechanism 10800, the frame body 101, and the second driving mechanism 10801 may be found elsewhere in the present disclosure, e.g., FIG. 4 and its relevant descriptions thereof.

The shifting fork may be used for connection and transmission. In some embodiments, one end of the shifting fork 108000 may be rotationally connected to the multi-filar guide 102, other end of the shifting fork 108000 may be connected to the second driving mechanism 10801, and the second driving mechanism 10801 may drive the shifting fork 108000 to slide along the guide rod 108001.

The guide rod may be a cylindrical component used for guiding.

In some embodiments, a clamp 1010 may be fixed on the multi-filar guide 102 and provided with a groove connected to the shifting fork 108000, an end of which may rotationally connected to the clamp 1010 by clamping into the groove, which may cause the connection between the shifting fork 108000 and the multi-filar guide 102 more convenient.

In some embodiments, the structure settings of the shifting fork 108000 may facilitate controlling movement of the multi-filar guide 102 without affecting the rotation of the multi-filar guide 102. Moreover, compared to setting the plurality of telescopic cylinders, the shifting forks is simpler and more reasonable, which may reduce unnecessary power settings.

Figure 11:
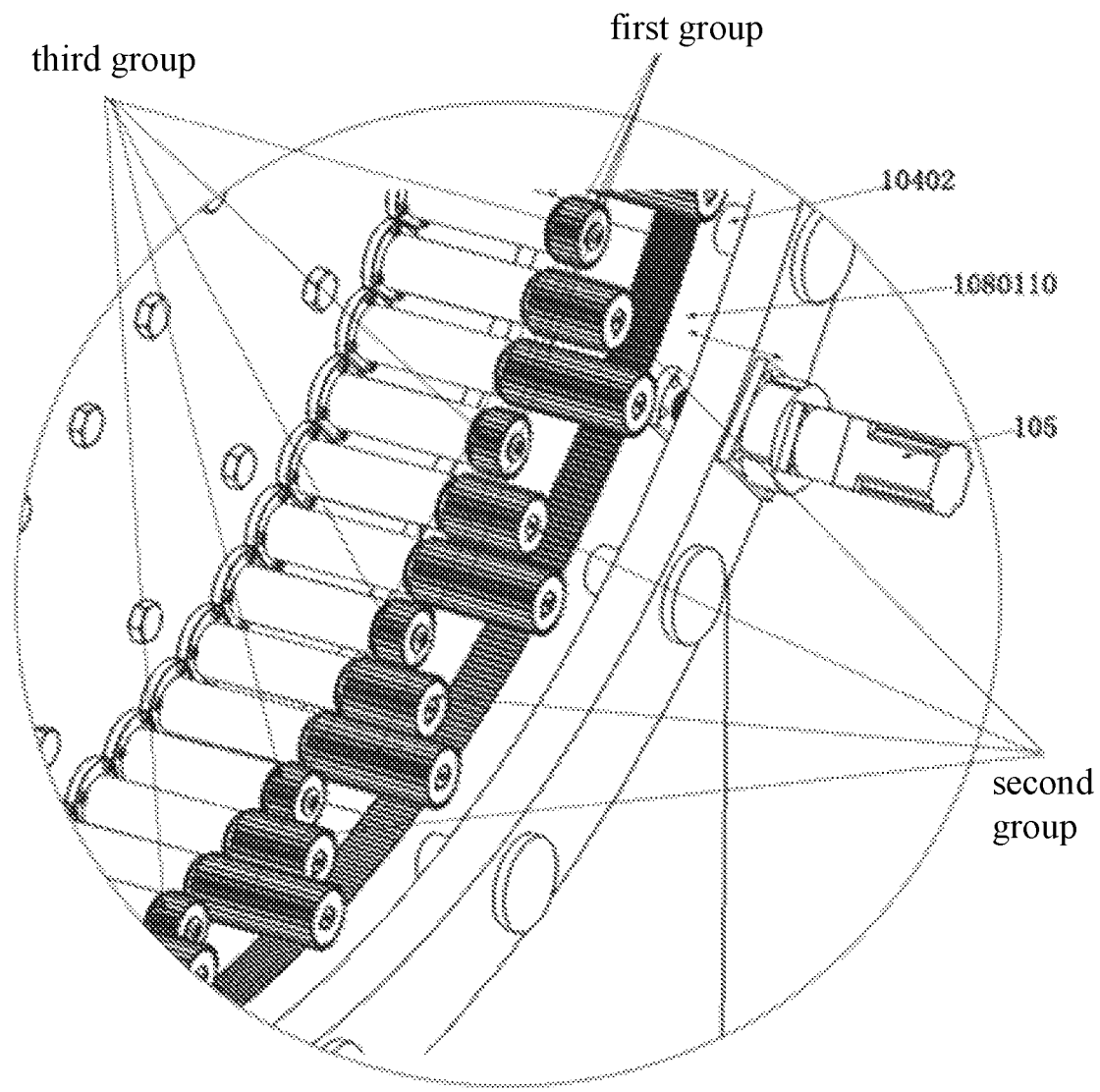
FIG. 11 is a partial enlarged view of part B in FIG. 4 according to some embodiments of the present disclosure.

FIG. 11 is a partial enlarged view of part B in FIG. 4 according to some embodiments of the present disclosure.

The second driving mechanism may be a mechanism used to drive another component in the driving device, which differs from the first driving mechanism. As shown in FIG. 5, in some embodiments, the second driving mechanism 10801 may include a second driving element 108010, a second gear transmission mechanism 108011, and a plurality of lead screw and nut mechanisms 108012. More descriptions regarding the second driving mechanism 10801 and the second driving element 108010 may be found elsewhere in the present disclosure, e.g., FIGS. 3 and 4, and the relevant descriptions thereof.

The lead screw and nut mechanism may be a mechanism that converts rotation to movement. As shown in FIG. 5, in some embodiments, each shifting fork 108000 may be connected to a lead screw and nut mechanism 108012, one end of the lead screw 1080121 in the lead screw and nut mechanism 108012 may be fixedly connected to the shifting fork 108000, and the nut 1080120 in the lead screw and nut mechanism 108012 may be rotationally connected to the frame body 101. The rotation of the nut 1080120 may be converted into the movement of the lead screw 1080121 in the lead screw and nut mechanism 108012, which drives the shifting fork 108000 to move along the guide rod 108001.

The second driving element may be an element used in the second driving mechanism, which differs from the first driving element, for example, a servo motor, a hydraulic motor, etc. As shown in FIG. 3, in some embodiments, the second driving element 108010 may drive the second gear ring 1080110 to rotate through the gears or the second worm 109 meshing with gears (an outer gear ring) of a second slewing bearing 104. More descriptions regarding the second slewing bearing 104 may be found elsewhere in the present disclosure, e.g., FIG. 5 and its relevant descriptions thereof.

In some embodiments, the second driving element 108010 may be fixed on the frame body 101 instead of moving with the second gear ring 1080110, which may ensure stability of the process of driving.

The second worm may be an element used in the second driving mechanism to achieve transmission between the two intersecting axes by meshing, which differs from the first worm. In some embodiments, the second worm 109 may be meshed with the gears on the second slewing bearing 104.

The second slewing bearing may be a transmission element that needs to make relative rotation movement between two objects, and bear axial force, radial force, and tipping moment at the same time. The second slewing bearing may include an inner ring, an outer ring, a rolling element, etc. In some embodiments, the second slewing bearing may be provided with gears.

The second gear transmission mechanism may be a mechanism used for transmission using gears, which differs the first gear transmission mechanism. As shown in FIG. 5, in some embodiments, the second gear transmission mechanism 108011 may include the second gear ring 1080110 and a plurality of the second connecting columns 1080111.

The second gear ring may be another component used to connect to gears and mesh with gears to drive the gears to rotate, which differs from the first gear ring. In some embodiments, the second gear ring 1080110 may be rotationally connected to the frame body 101, and the second gear ring 1080110 may be driven to rotate by the second driving element 108010.

The second connecting column may be a cylindrical element used to connect two components, which differs from the first connecting column. In some embodiments, the plurality of second connecting columns 1080111 may be rotationally connected to the frame body 101, and each lead screw and nut mechanism 108012 may be connected to a second connecting column 1080111 in the plurality of second connecting columns.

As shown in FIG. 5, in some embodiments, the second connecting column 1080111 may be driven to rotate through the rotation of the second gear ring 1080110, the second connecting column 1080111 may drive the multi-filar guide 102 to expand and contract, and an end of the second connecting column 1080111 may be provided with a second connecting gear 1080112 meshing with the second gear ring 1080110, and other end of the second connecting column 1080111 may be provided with a second transmission gear 1080113 meshing with outer gears of the nut 1080120. More descriptions regarding the second driving element 108010 may be found elsewhere in the present disclosure, e.g., FIG. 3 and its relevant descriptions thereof.

The second connecting gear may be an element used to connect the elements using meshing, which differs from the first connecting gear. In some embodiments, the second connecting gear 1080112 may be meshed with the second gear ring 1080110.

The second transmission gear may be an element for transmission using gear meshing, which differs from the first transmission gear. In some embodiments, the second transmission gear 1080113 on the second connecting column 1080111 may be meshed with the outer gears of the nut 1080120 to achieve transmission.

The helical winding device may achieve control separately by changing the structure and achieve variable driving through driving a corresponding number of the multi-filar guides to expand and contract for performing winding operation according to a size of the workpiece.

As shown in FIG. 5, in some embodiments, the second connecting column 1080111 may be driven to rotate through the rotation of the second gear ring 1080110 by meshing with the second connecting gear 1080112 at an end of the second connecting column 1080111, the nut 1080120 may be driven to rotate through the rotation of the second connecting column 1080111 by the second transmission gear 1080113 at the other end of the second connecting column 1080111 meshing with the outer gears of the nut 1080120, the rotation of the nut 1080120 may be converted into the movement of the lead screw 1080121 so as to drive the shifting fork 108000 to move along the guide rod 108001, the shifting fork 108000 may be connected to the multi-filar guide 102, and when the shifting fork 108000 moves, it may drive the multi-filar guides to move. Therefore, when rotating, the first gear ring 103010 may drive all the multi-filar guides 102 to expand and contract.

As shown in FIG. 5, in some embodiments, the second gear ring 1080110 may be rotationally connected to the frame body 101 through the second slewing bearing 104, and the second gear ring 1080110 may be slidably connected to the second slewing bearing 104. The third driving mechanism 105 may be arranged between the second gear ring 1080110 and the second slewing bearing 104, which drives the second gear ring 1080110 to slide along an axis of the second gear ring 1080110. A plurality of the second connecting columns 1080111 are divided into at least two groups, the second connecting gear 1080112 may be meshed with the second connecting gears 1080112 on one or more groups of the second connecting columns 1080111 through the movement of the second gear ring 1080110 to drive the corresponding multi-filar guides to expand and contract, and the second driving element 108010 may be connected to the second slewing bearing 104. More descriptions regarding for the third driving mechanism 105 may be found elsewhere in the present disclosure, e.g., FIG. 11 and its relevant descriptions thereof. In some embodiments, the number of multi-filar guides used for the winding may be selected according to the size of the pressure vessel. Therefore, the required multi-filar guides may be controlled to extend out for performing winding operation according to the size of the pressure vessel.

The third driving mechanism may be other components used in the driving device, which differs from the first driving mechanism and second driving mechanism. In some embodiments, the third driving mechanism 105 may be arranged between the second gear ring 1080110 and the second slewing bearing 104, which drives the second gear ring 1080110 to slide along the axis of the second gear ring 1080110.

As shown in FIG. 5, in some embodiments, an inner ring 10400 of the second slewing bearing 104 may be fixedly connected to the frame body 101, and an outer ring 10401 of the second slewing bearing 104 may be slidably connected to the second gear ring 1080110, or vice versa. The slidable connection may be achieved by setting corresponding sliding groove, a corresponding sliding column 10402, and other structures. For example, the outer gear ring 10401 may be provided with the sliding column 10402, the second gear ring 1080110 may be connected to the sliding column 10402, and the second gear ring 1080110 may be provided with a corresponding connection hole. The third driving mechanism 105 may use a variety of mechanisms with linear movement functions, such as electric telescopic cylinders, screw elevators, etc. Taking the electric telescopic cylinder as an example, a cylinder of the electric telescopic cylinder may be fixedly connected to the second gear ring 1080110, a rod body of the electric telescopic cylinder may be fixed with the outer gear ring 10401, and the sliding (movement) of the second gear ring 1080110 may be achieved through the expansion and contraction of the rod body.

As shown in FIG. 5, in some embodiments, a number of the second connecting column 1080111 may be set as 60, which connecting column may be divided into three groups, and each group may include 20 connecting columns (for another example, the second connecting columns may also be unevenly divided). When moving, the second gear ring 1080110 may be meshed with the second connecting gear 1080112 on the second connecting columns 1080111 of the first group (the number of the second connecting columns in the first group being 20) to drive 20 second connecting columns 1080111 to rotate at the same time, that is, 20 multi-filar guides may be driven to extend out for performing winding on the workpieces with a small size. When continuing to move, the second gear ring 1080110 may be meshed with the second connecting gear 1080112 on the second connecting columns 1080111 of the two groups (e.g., the first group and second group) to drive 40 second connecting columns 1080111 to rotate at the same time, that is, 40 multi-filar guides may be driven to extend out for performing winding on the workpieces with a middle size. When continuing to move again, the second gear ring 1080110 may be meshed with the second connecting gear 1080112 on the second connecting columns 1080111 of the three groups (all the groups) to drive 60 second connecting columns 1080111 to rotate at the same time, that is, 60 multi-filar guides may be driven to extend out for performing winding on workpieces with a large size.

As shown in FIG. 5, in some embodiments, an axial length of the second connecting gear 1080112 on the second connecting columns 1080111 in each group may be set to be different, and the axial length of the second connecting gear 1080112 in each group may gradually increase or decrease to ensure that the second gear ring 1080110 may be meshed with the corresponding second connecting gear 1080112 during the movement, so as to change (increase or decrease) the number of the second connecting gear 1080112 meshing with the second gear ring. Of course, the above functions may be realized by changing the setting position of the second connecting gear 1080112 in each group.

As shown in FIG. 5, in some embodiments, a number of the second connecting columns 1080111 may be set as 60, which may also be divided into three groups. The axial length of the second connecting gear 10801112 on the second connecting columns 1080111 of the first group may be larger than the axial length of the second connecting gear 10801112 on the second connecting columns 1080111 of the second group, and the axial length of the second connecting gear 10801112 on the second connecting columns 1080111 of the second group may be larger than the axial length of the second connecting gear 10801112 on the second connecting columns 1080111 of the third group. Therefore, when moving, the second gear ring 1080110 may be meshed with the second connecting gear 1080112 in the first group, when continuing to move, the second gear ring 1080110 may be meshed with the second connecting gear 1080112 in the first and second groups at the same time, when continuing to move again, the second gear ring 1080110 may be meshed with the second connecting gear 1080112 in the first, second, and third groups at the same time.

The second gear ring 1080110 may not only need to be driven to move through the third driving mechanism 105, but also need to be driven to rotate through the second driving element 108010. Therefore, the methods may be adopted as follows: appropriately increasing the axial length of the second gear ring 1080110 to ensure that it may be connected to the second driving element 108010 no matter how the second gear ring 1080110 moves, slidably connection between the second driving element 108010 and the second slewing bearing 104 or the frame body 101 to ensure that the second driving element 108010 may move with the second gear ring 1080110. More descriptions regarding the second driving element 108010 may be found elsewhere in the present disclosure, e.g., FIG. 3 and its relevant descriptions thereof. In conclusion, the second driving element 108010 may be connected to the second gear ring 1080110 to drive the second gear ring 1080110 to rotate via a variety of structures.

Figure 12:
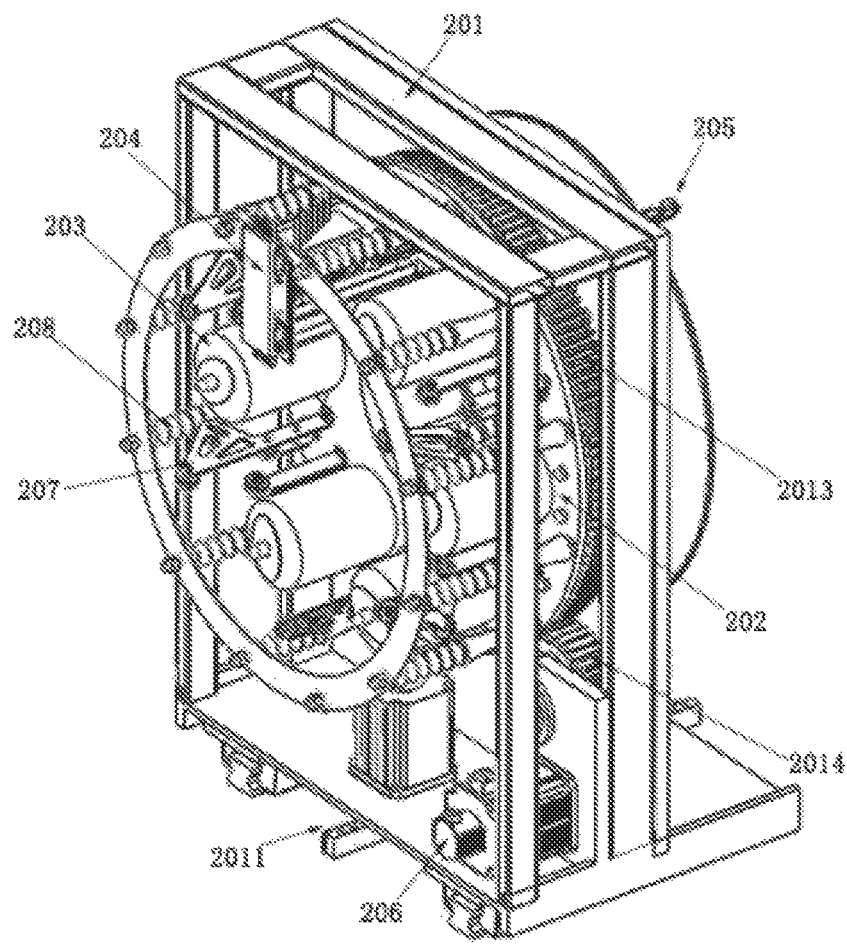
FIG. 12 is an axonometric view of a circumferential winding device in one direction according to some embodiments of the present disclosure.

FIG. 12 is an axonometric view of a circumferential winding device in one direction according to some embodiments of the present disclosure.

As shown in FIG. 12, in some embodiments, the circumferential winding device 20 may include a frame 201, a fixing plate 202, a plurality of filament bundle cylinders 203, a bundle collecting device 204, and a guidewire component 205.

In some embodiments, during the winding process, the circumferential winding device may drive the overall body to perform a reciprocation along an axial direction of the workpiece through the frame 201, while performing a rotation of the filament bundle along the circumferential direction of the workpiece through the rotation of the fixing plate 202, so as to achieve the circumferential winding on the workpiece. This winding method may effectively overcome defects such as instability in the moving process and the rotation process of the workpiece, so as to ensure the winding effect.

Figure 13:
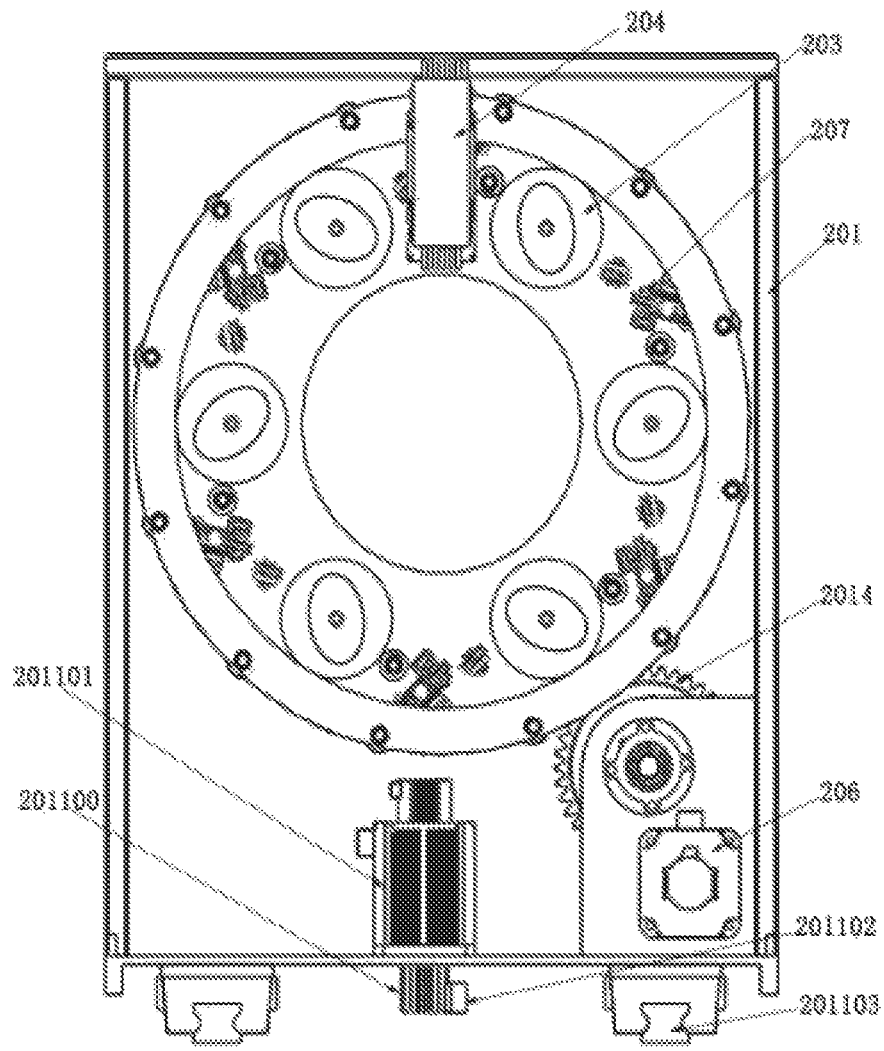
FIG. 13 is a rear view of the circumferential winding device according to some embodiments of the present disclosure.

FIG. 13 is a rear view of the circumferential winding device according to some embodiments of the present disclosure.

Figure 14:
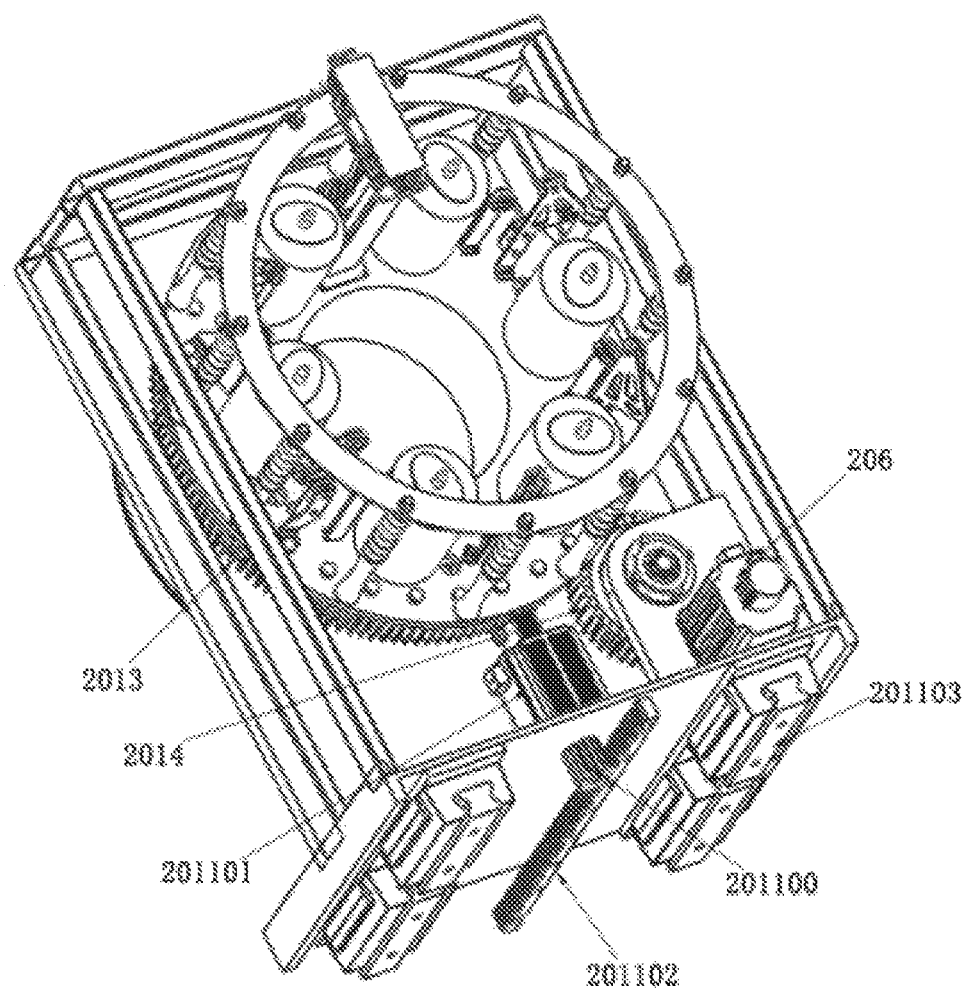
FIG. 14 is a structural diagram of a translation mechanism according to some embodiments of the present disclosure.

FIG. 14 is a structural diagram of a translation mechanism according to some embodiments of the present disclosure.

The frame may be used to mount components in the device and bear weight of the whole device, or the like. As shown in FIG. 13, in some embodiments, a bottom of frame 201 may be provided with a translation mechanism 2011. The translation mechanism may be used to drive the frame 201 to translate. The setting of the translation mechanism 2011 may cause that the workpiece only needs to be fixed without axially moving of the workpiece during the winding process.

The translation mechanism may be implemented by various structures in existing technologies, such as hydraulic mechanisms, gear rack mechanisms, linear actuators, etc. As shown in FIGS. 13 and 14, in some embodiments, the bottom of the frame 201 may be provided with a sliding rail 201103, the frame 201 may be slidably connected to the sliding rail 201103 and a rack 201102 may be fixed on the ground. A driving gear 201100 arranged on the bottom of the frame 201 may be meshed with the rack 201102, which may be connected to a corresponding driving motor 201101. The driving gear 201100 may be driven to rotate along the sliding rail 201103 through the driving motor 201101 and the driving gear 201100 may be meshed with the rack 201102 so as to achieve the movement of the frame 201 along the sliding rail 201103.

In some embodiments, the translation mechanism may drive the frame 201 to translate to ensure that the pressure vessel to be wound is in a static state during performing multi harness circumferential winding, the multi harness circumferential winding may be performed through the movement of the frame 201 and the rotation of the fixing plate. The pressure vessel is in a static state, which may effectively improve the stability of the winding to further improve the winding effect.

Figure 15:
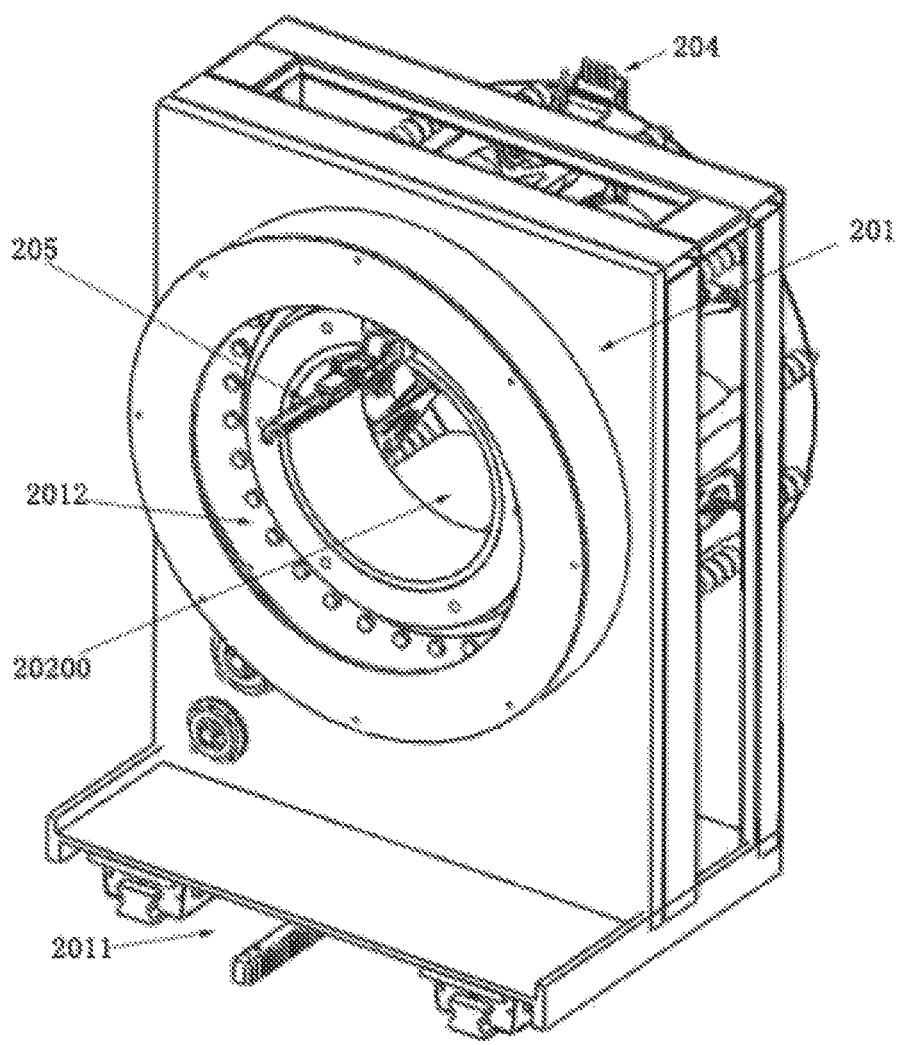
FIG. 15 is an axonometric view of the circumferential winding device in another direction according to some embodiments of the present disclosure.

FIG. 15 is an axonometric view of the circumferential winding device in another direction according to some embodiments of the present disclosure.

The fixing plate may be used to mount and fix components. The fixing plate may be rotated using a variety of structures. As shown in FIG. 12, in some embodiments, the fixing plate 202 may be rotationally connected to the frame 201, and the fixing plate 202 may be connected to a driving element 206 that drives the fixing plate 202 to rotate.

As shown in FIG. 12, in some embodiments, the fixing plate 202 may be provided with a plurality of winding rollers, each winding roller 208 in the plurality of winding rollers 208 may be located outside of each filament bundle cylinder 203, and each winding roller 208 distributed in a circumference along the center of the first through-hole 20200 may be rotationally connected to the fixing plate 202. More descriptions regarding the first through-hole 20200 may be found elsewhere in the present disclosure, e.g., FIG. 15 and its relevant descriptions thereof.

In some embodiments, because distribution positions of the plurality of the filament bundle cylinders are different, the winding rollers may be set to meet synchronization of multi-filament winding and ensure the initial tension of the filaments.

The winding roller may be a device used for winding a wire body. In some embodiments, a variety of winding methods may be adopted for achieving the synchronous winding of multi-filaments according to the requirement when each filament bundle passes the winding roller 208.

As shown in FIG. 12, in some embodiments, the fixing plate 202 may be rotationally connected to the frame 201 through the first slewing bearing 2012 and the driving element 206 may be meshed with the gear ring 2013 of the first slewing bearing 2012 through the gears 2014 to drive the fixing plate 202 to rotate. The driving element 206 may include a motor, a hydraulic motor, etc. An output shaft of the driving element 206 may be connected to the gears 2014 to drive the first slewing bearing 2012 and the fixing plate 202 to rotate. More descriptions regarding the first slewing bearing 2012 may be found elsewhere in the present disclosure, e.g., FIG. 15 and its relevant descriptions thereof.

The first slewing bearing may be a transmission element that needs to make a relative rotation movement between the two objects and bear axial force, radial force, and tipping moment at the same time, which differs from the second slewing bearing. The first slewing bearing may include an inner ring, an outer ring, a rolling element, etc. The inner ring or the outer ring may be fixed with a gear ring and the rolling body may be arranged between the inner ring and the outer ring. As shown in FIG. 14, in some embodiments, the inner ring of the first slewing bearing 2012 may be fixedly connected to the frame 201, and the outer ring may be fixedly connected to the fixing plate 202.

Figure 16:
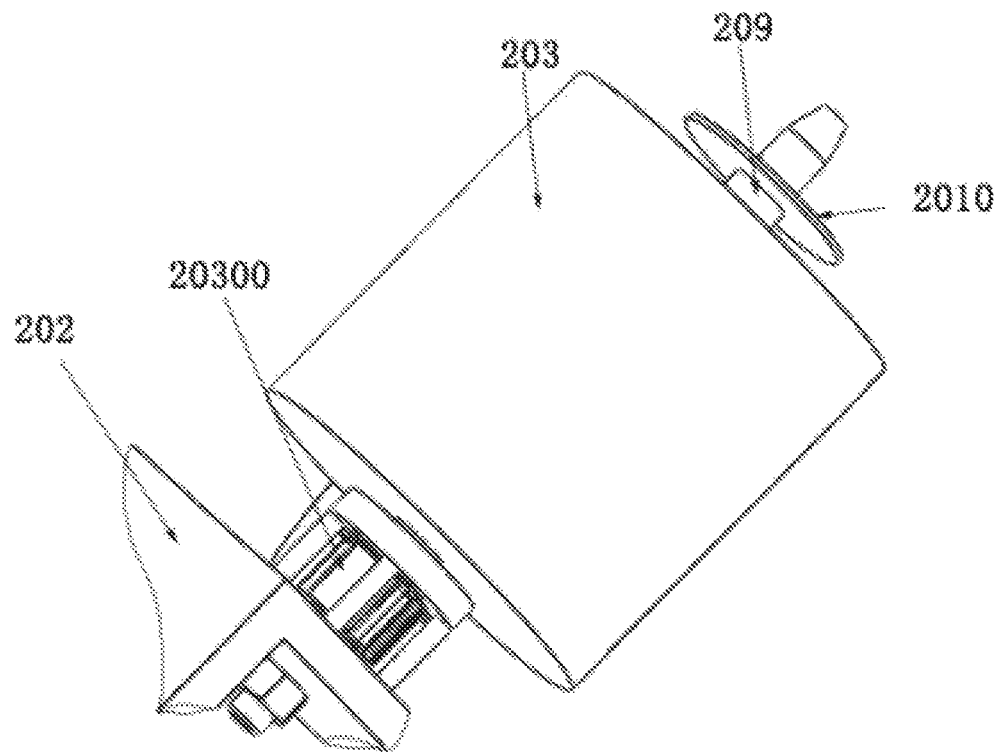
FIG. 16 is a structural diagram of a support shaft according to some embodiments of the present disclosure.

FIG. 16 is a structural diagram of a support shaft according to some embodiments of the present disclosure.

The filament bundle cylinder may be a cylindrical component used to provide filament bundles. As shown in FIG. 12, in some embodiments, each filament cylinder 203 in a plurality of filament bundle cylinders 203 may corresponds to a tension controller 207, a middle part of the fixing plate 202 may be provided with a first through-hole 20200, and each filament bundle cylinder 203 distributed in a circumference along the center of the first through-hole 20200 may be rotationally connected to the fixing plate 202, each tension controller 207 may be fixedly connected to the fixing plate 202. More descriptions regarding the first through-hole 20200 may be found elsewhere in the present disclosure, e.g., FIG. 15 and its relevant descriptions thereof.

As shown in FIG. 12, in some embodiments, each filament bundle cylinder 203 may be respectively connected to the servo motor of the filament bundle cylinder 203, and the filament bundle cylinder 203 may be driven to rotate through the servo motor of the filament bundle cylinder 203. A shell of the servo motor of the filament bundle cylinder 203 may be fixed with the fixing plate 202, and an output shaft of the servo motor of the filament bundle cylinder 203 may be connected to the filament bundle cylinder 203. That is, the rotating connection between the filament bundle cylinder 203 and the fixing plate 202 may be realized through the servo motor of the filament bundle cylinder 203.

As shown in FIG. 16, in some embodiments, a support shaft 209 may be fixed on the fixing plate 202, which may be used to be rotationally connected to the filament bundle cylinder 203, and an end of the support shaft 209 may be connected to a removable baffle 2010. In use, the filament bundle cylinder 203 may be inserted into the support shaft 209, and then the removable baffle 2010 may be connect to the end of the support shaft 209 to prevent the filament bundle cylinder 203 removing from the support shaft 209. The removable baffle 2010 and the support shaft 209 may be connected with common detachable connection methods such as a bolt connection, an insertion, and a card connection to facilitate mounting and removal of the filament bundle cylinder.

The support shaft may be a cylindrical part used to support. In some embodiments, the support shaft 209 may be connected to the filament bundle cylinder 203.

The removable baffle may be used to prevent objects from moving out, overflow, etc. In some embodiments, the removable baffle 2010 may be connected to the end of the support shaft 209 to prevent the filament bundle cylinder 203 moving out from the support shaft 209.

In some embodiments, when the support shaft 209 is used, the servo motor of the filament bundle cylinder 203 may use a motor with a hollow shaft, and the support shaft 209 may pass through the hollow shaft of the motor.

Figure 17:
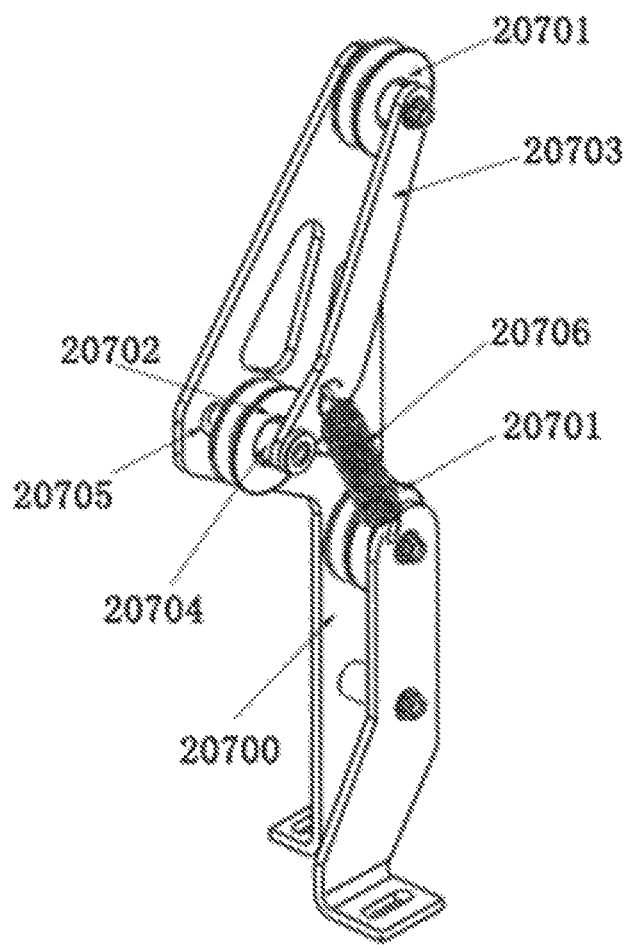
FIG. 17 is a structural diagram of a tension controller in one direction according to some embodiments of the present disclosure.

FIG. 17 is a structural diagram of a tension controller in one direction shown in some embodiments in the present disclosure.

In some embodiments, the tension controller may be a component for regulating the tension of the filament bundle, which may include mechanical tension controllers, electronic tension controllers, etc.

As shown in FIG. 17, in some embodiments, the tension controller 207 may include a tension frame 20700, two tension wheels 20701, and a balance wheel 20702. The two tension wheels 20701 may be both rotationally connected to the tension frame 20700, and the balance wheel 20702 may be connected to the tension frame 20700 through a swing arm 20703, the balance wheel 20702 may be rotationally connected to the swing arm 20703, an end of the swing arm 20703 may be rotationally connected to the tension frame 20700, and other end of the swing arm 20703 may be provided with a guide pin 20704. The tension frame 20700 may be provided with a sliding groove 20705 that is connected to the guide pin 20704, and the guide pin 20704 may move along the sliding groove 20705. A spring 20706 may be arranged between the swing arm 20703 and the tension frame 20700, and the spring 20706 may generate elastic potential energy when the swing arm 20703 rotates. In some embodiments, the two tension wheels 20701 and the balance wheel 20702 may be distributed in a triangle, and the filament bundles successively pass through, which may control the tension of the filament bundle to ensure the winding effect.

The tension frame may be used to support, fix, and connect other components in the mechanism.

The tension wheel may be used to drag and load the filament bundles and cooperate to implement tension control.

The balance wheel may be used to drag and load the filament bundles and cooperate to implement tension control by using the swing.

The swing arm may use rotation to force the spring in the mechanism to generate the elastic potential energy.

As shown in FIG. 17, in some embodiments, the filament wound on the filament bundle cylinder 203 may pass through two tension wheels 20701 and the balance wheel 20702, and the tension of the filament may be controlled by the swing arm 20703 and the spring 20706. When the swing arm 20703 rotate at different angles, the spring 20706 may generate different elastic potential energy, so as to implement mechanical tension control. More descriptions regarding filament bundle cylinder 203 may be found elsewhere in the present disclosure, e.g., FIG. 12 and its relevant descriptions thereof.

As shown in FIG. 12, in some embodiments, the servo motor of the filament bundle cylinder 203 may realize active wire feeding. The tension between the filaments may be ensured to be consistent by adjusting the rotation speed of the servo motor of the filament bundle cylinder 203 and cooperating with the tension controller 207.

In some embodiments, a plurality of filament bundle cylinders 203, a tension controller 207, and a winding roller 208 may be provided. After the filament bundle wound on each filament bundle cylinder passing through the corresponding tension controller 207 and corresponding winding roller 208 successively and converging by the bundle collecting device 204, the multi-filaments may be extended out from the guidewire component 205. The fixing plate may be driven to rotate by the driving device to achieve a circumferential winding of the pressure vessel. Because multi-filaments are winding at the same time during the winding process, the production efficiency is effectively improved. At the same time, the gap between the filament bundles is small, which is suitable for the winding processing of various revolving bodies, so it may be widely promoted in the fields of automotive industry, construction industry, and aerospace industry.

Figure 18:
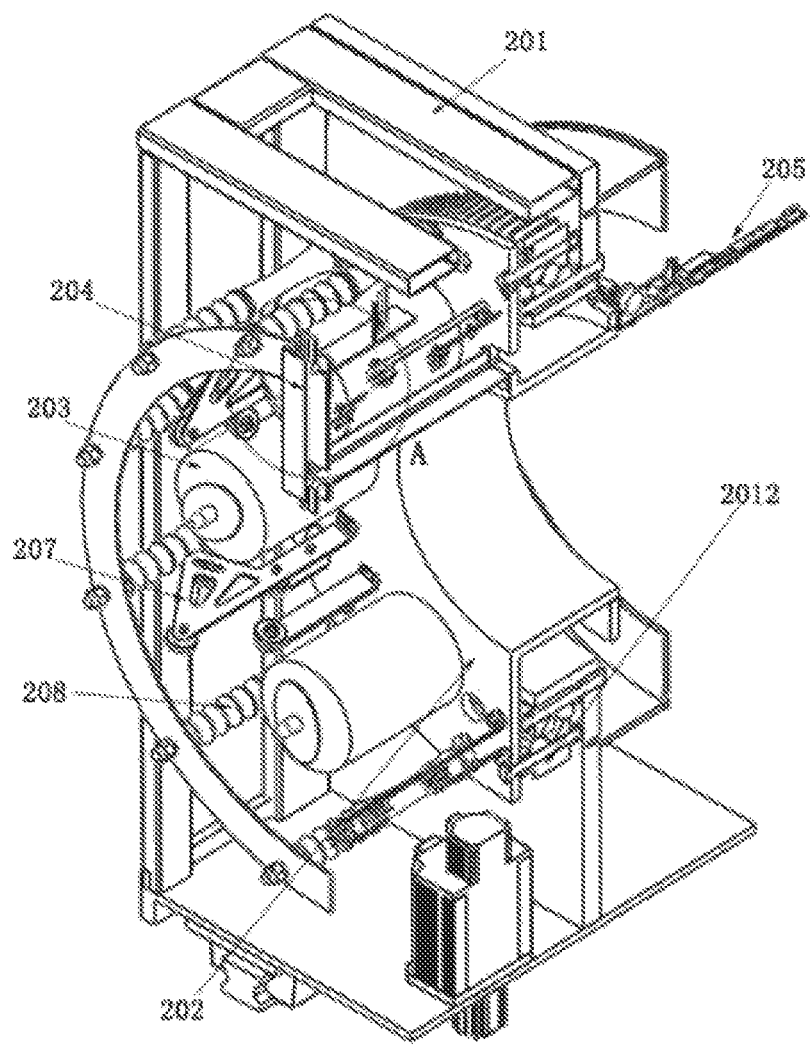
FIG. 18 is a half sectional view of the circumferential winding device according to some embodiments of the present disclosure.

FIG. 18 is a half sectional view of the circumferential winding device according to some embodiments of the present disclosure.

Figure 19:
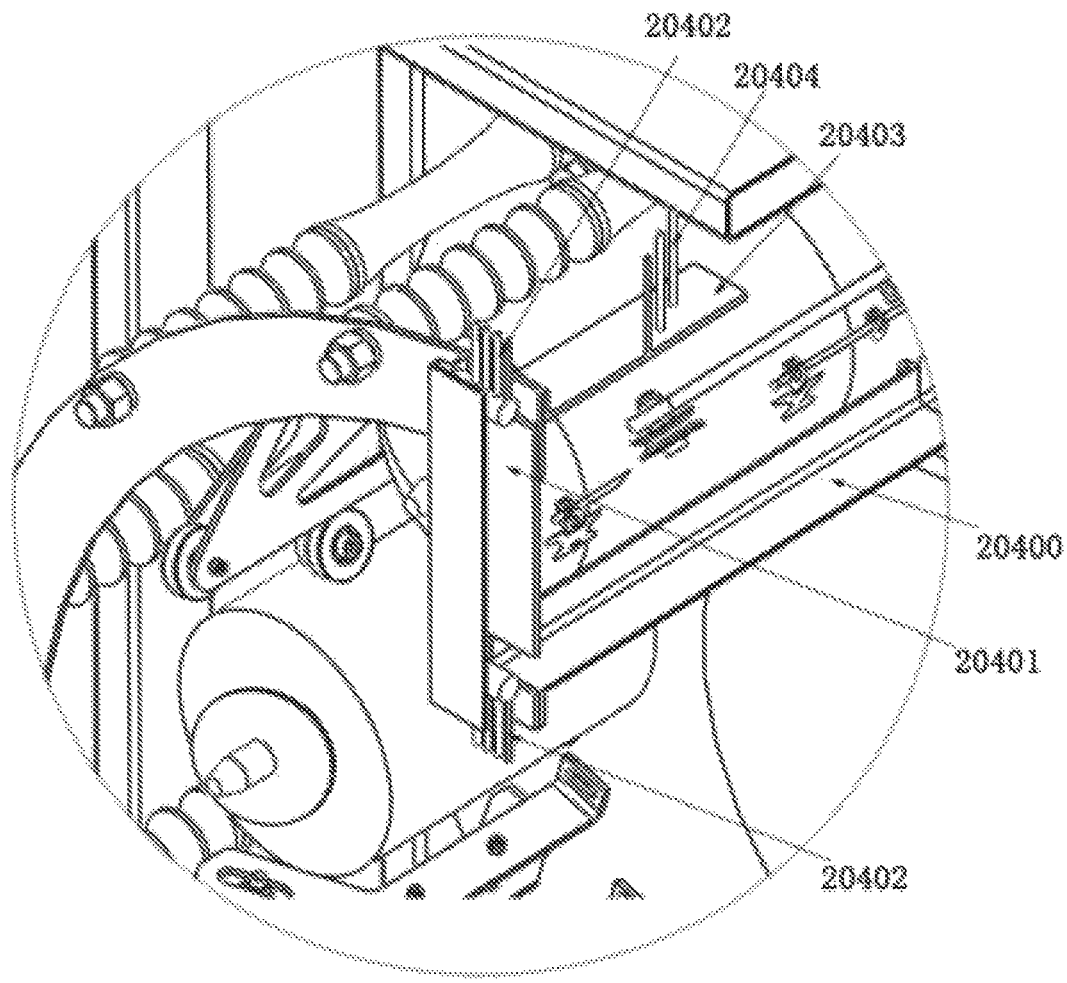
FIG. 19 is a partial enlarged view of part A in FIG. 18 according to some embodiments of the present disclosure.

FIG. 19 is a partial enlarged view of part A in FIG. 18 according to some embodiments of the present disclosure.

Figure 20:
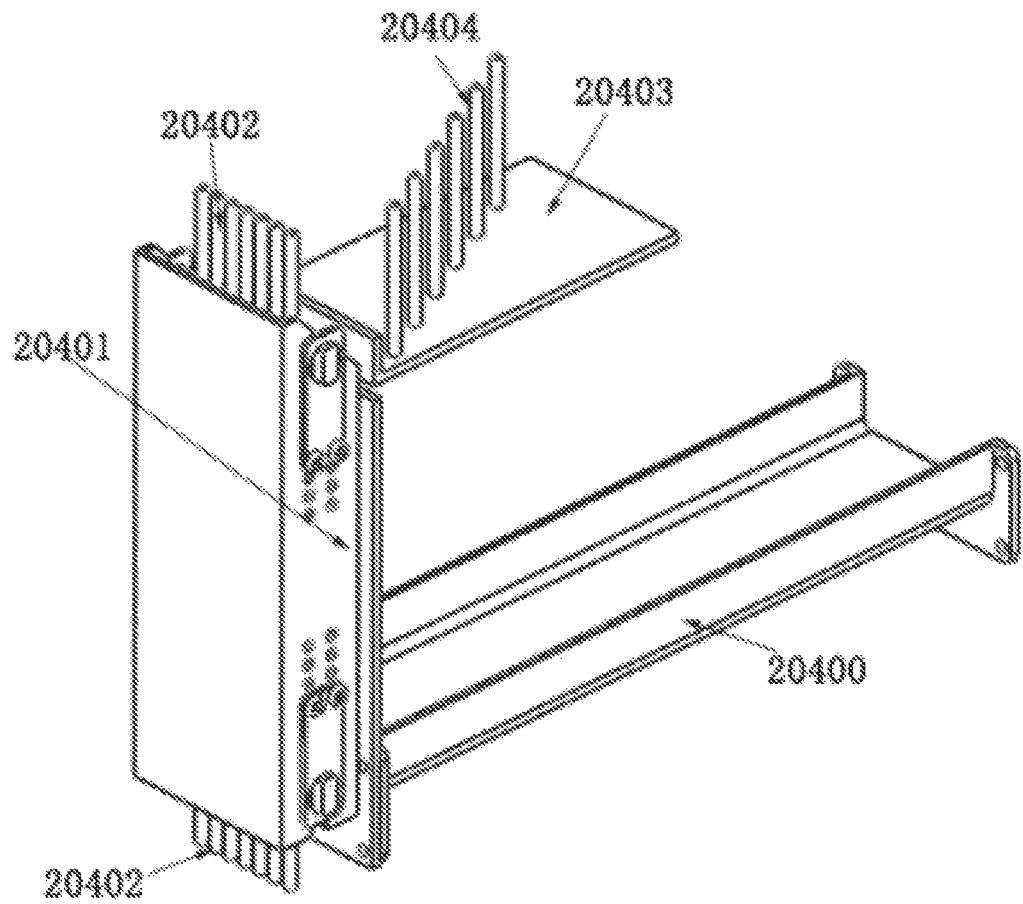
FIG. 20 is a structural diagram of a bundle collecting device according to some embodiments of the present disclosure.

FIG. 20 is a structural diagram of a bundle collecting device according to some embodiments of the present disclosure.

In some embodiments, the bundle collecting device may be a device for gathering filament bundles. As shown in FIGS. 19 and 20, in some embodiments, the bundle collecting device 204 may include a bracket 20400 and a guide plate 20401. More descriptions regarding the bundle collecting device 204 may be found elsewhere in the present disclosure, e.g., FIG. 18 and its relevant descriptions thereof.

The bracket may be used to support components. As shown in FIGS. 19 and 20, an end of the bracket 20400 may be fixedly connected to the fixing plate 202 and other end of the bracket may be fixedly connected to the guide plate 20401. More descriptions regarding the fixing plate 202 may be found elsewhere in the present disclosure, e.g., FIG. 18 and its relevant descriptions thereof.

The guide plate may be a plate-shaped element for guiding. As shown in FIGS. 19 and 20, in some embodiments, two ends of the guide plate 20401 may be provided with guide gears 20402 respectively. The guide gears may include gears, racks, etc., which are used for guiding.

As shown in FIGS. 19 and 20, in some embodiments, an upper end of the guide plate 20401 may be fixed with a transition plate 20403.

The transition plate may be a plate-shaped element for transition. As shown in FIGS. 19 and 20, in some embodiments, the transition plate 20403 may be provided with transition gears 20404, the filaments may extend out from the guidewire component 205 after passing through the transition gears 20404 and the guide gears 20402 successively, thereby ensuring the synchronization of each filament bundle. More descriptions regarding the guidewire component 205 may be found elsewhere in the present disclosure, e.g., FIG. 18 and its relevant descriptions thereof.

As shown in FIGS. 19 and 20, in some embodiments, after bypassing the winding roller 208, each filament bundle may be combed by the transition gears 20404 on the transition plate 20403, and then each filament bundle may be separated through the guide gears 20402 arranged on two ends of the guide plate 20401 to avoid deformation between the filament bundles. At the same time, the transition gears 20404 and the guide gears 20402 may be relative thin, so a distance between the filament bundles may be ignored. More descriptions regarding the winding rollers 208 may be found elsewhere in the present disclosure, e.g., FIG. 12 and its relevant descriptions thereof.

Figure 21:
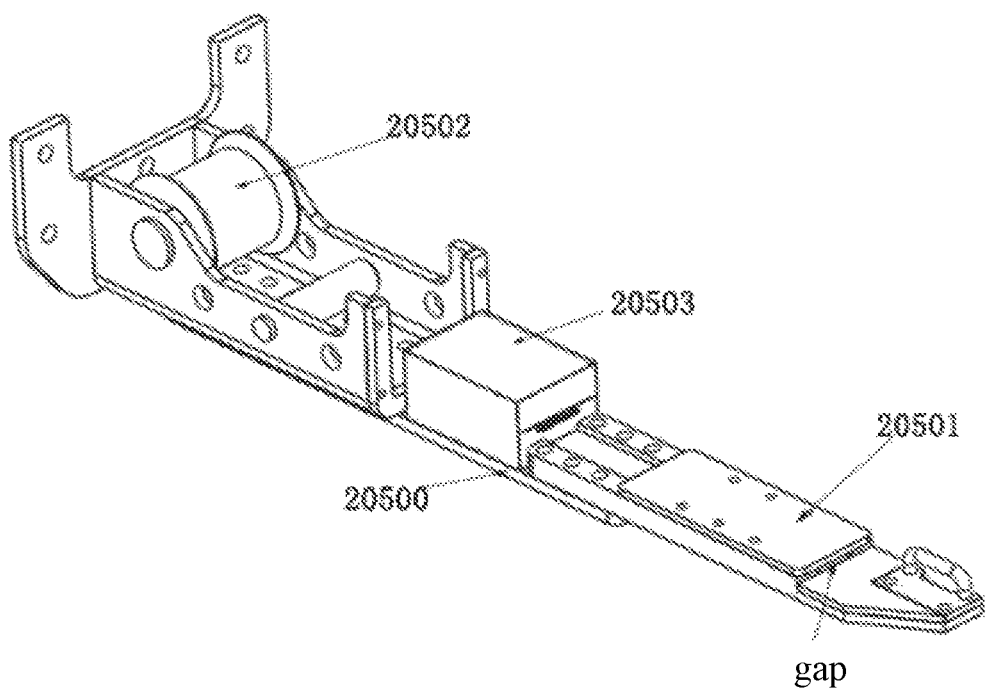
FIG. 21 is a structural diagram of a guidewire component according to some embodiments of the present disclosure.

FIG. 21 is a structural diagram of a guidewire component according to some embodiments of the present disclosure.

In some embodiments, the guidewire component may be a component used to guide the filament bundle to extend out. As shown in FIG. 21, in some embodiments, the guidewire component 205 may include a guidewire frame 20500 and a pressure head 20501. More descriptions regarding the guidewire component 205 may be found elsewhere in the present disclosure, e.g., FIG. 18 and its relevant descriptions thereof.

The guidewire frame may be a component used for mounting, fixing, and support. As shown in FIG. 21, in some embodiments, the guidewire frame 20500 may be fixedly connected to the fixing plate 202. More descriptions regarding fixing plate 202 may be found elsewhere in the present disclosure, e.g., FIG. 18 and its relevant descriptions thereof.

The pressure head may be a component that shapes and maintains a shape of an object. As shown in FIG. 21, in some embodiments, the pressure head 20501 may be fixedly connected to the guidewire frame 20500, and the filament bundle may extend out from a gap between the pressure head 20501 and the guidewire frame 20500. The setting of the gap may ensure that the filaments passes through it without deformation, specific spacing of which may be adjusted and designed according to the filament bundle.

In some embodiments, each filament bundle may be extended out to a side of the guidewire component 205, gather together at the guidewire component 205, and be extended from the gap to the pressure vessel.

As shown in FIG. 21, in some embodiments, the guidewire component 205 may also include a guidewire roller 20502 and a dipping box 20503. The smoothness of the multi-bundle winding may be improved through the guidewire roller, the surface of each filament bundle may be attached with dipping solution after passing the dipping box, so as to realize wet winding. More descriptions regarding the guidewire component may be found elsewhere in the present disclosure, e.g., FIG. 18 and its relevant descriptions thereof.

The dipping box may be used to coat the dipping solution on the surface of the filament bundle. The dipping box may be designed as a variety of structures for coating the dipping solution. In some embodiments, the dipping box may be a cavity structure, and the cavity may be filled with dipping solution. Both sides of the dipping box may be provided with openings, the filaments may enter the cavity from an opening on one side to contact with the dipping solution and pass through from the opening of other side. A size of the openings on both sides may be just enough for the filament to pass through, which may not only ensure complete coverage of dipping solution of the filament surface, but also ensure uniformity of the dipping solution of the filament surface, which plays a role of frictioning. At the same time, the dipping box may be provided with an adding port of the dipping solution, which may be provided with a corresponding plug. When the dipping solution is needed to add, the plug may be removed and the dipping solution may be injected into the dipping box through the adding port of the dipping solution.

As shown in FIG. 21, in some embodiments, the dipping box 20503 may be fixedly connected to the guidewire frame 20500.

The guidewire roller may be used to guide and transmit the filament bundles. As shown in FIG. 21, in some embodiments, the wire roller 20502 may be rotationally connected to the guidewire frame 20500.

As shown in FIG. 21, in some embodiments, the filament bundle extended out from the bundle collecting device 204 may be extended out from the gap through the wire roller 20502 and the dipping box 20503 successively. The setting of the wire roller 20502 may ensure the stability of the fiber bundle in the moving process and the setting of the dipping box 20503 may coat the dipping solution on the surface of the filament bundle to achieve wet winding. More descriptions regarding the bundle collecting device 204 may be found elsewhere in the present disclosure, e.g., FIG. 18 and its relevant descriptions thereof.

As shown in FIG. 12, in some embodiments, the bundle collecting device 204 and the guidewire component 205 may be fixed on the fixing plate 202. After the filament bundle wound on each filament bundle cylinder 203 passing through the corresponding tension controller 207 and corresponding winding roller 208 successively and converging by the bundle collecting device 204, the multi-filaments may be extended out from the guidewire component 205.

As shown in FIG. 12, in some embodiments, the fixing plate 202 may be connected to the driving element 206, when the driving element 206 drives the fixing plate 202 to rotate, the filament bundle cylinder 203, the tension controller 207, and other components arranged on the fixing plate 202 may also rotate accordingly.

As shown in FIG. 12, in some embodiments, when circumferential winding, each filament bundle extended out from the filament bundle cylinder 203 may pass through the tension controller 207, then bypass each winding roller 208 successively, and finally gather in the bundle collecting device 204, which realizes the synchronization of each filament bundle. Then, the filament bundle may be extended out from the guidewire component 205 at the other end. The filament bundle extended out from the guidewire component 205 may be transmitted to the surface of the workpiece. After that, the fixing plate 202 may be driven to rotate by the driving element 206 so as to drive the filament bundle cylinder 203, the tension controller 207, and other components to rotate accordingly. During winding, the workpiece may move axially with cooperating with the rotation of the fixing plate 202 and the filament bundle cylinder 203, the tension controller 207, and other components arranged on the fixing plate 202, so as to achieve the circumferential winding of the multi-filaments along the pressure vessel.

In some embodiments, synchronously circumferential winding of the multi-filaments may increase the number of filament bundles and the winding efficiency of the rotating elements may be improved by designing an automatic (coupling) control system for the tension of the multi-filaments.

Figure 22:
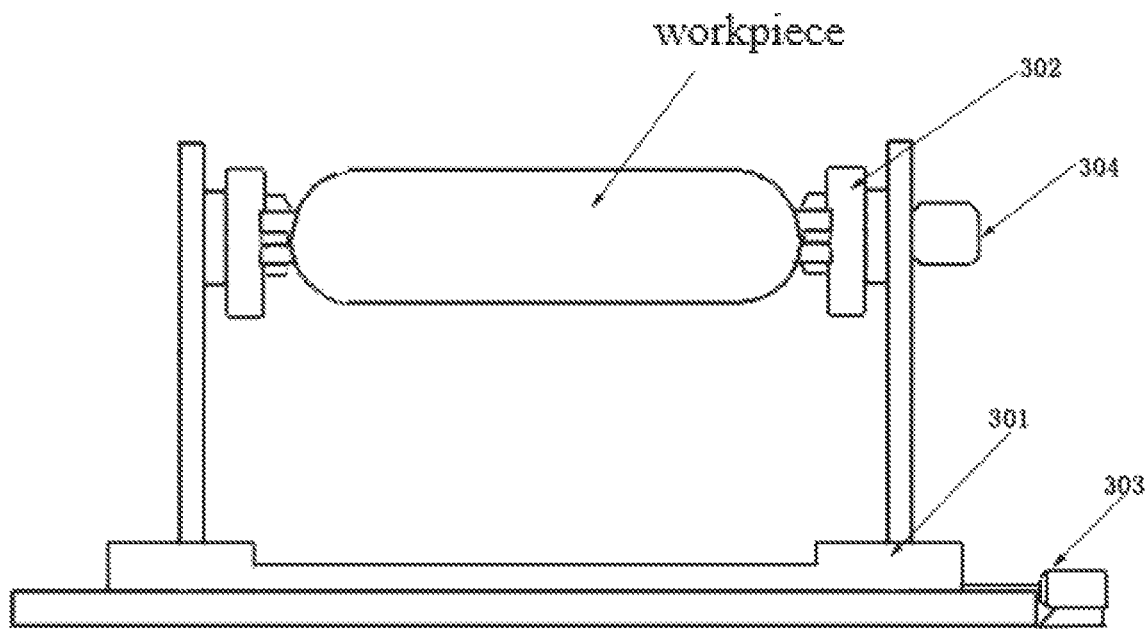
FIG. 22 is a schematic diagram of a fixing device according to some embodiments of the present disclosure.

FIG. 22 is a schematic diagram of a fixing device according to some embodiments of the present disclosure.

The fixing device may be used to clamp and fix the workpiece and drive the workpiece to rotate and move. The fixing device may adopt a variety of structural designs. As shown in FIG. 22, in some embodiments, the fixing device 30 may include a clamper 302 and a movable seat 301.

The clamper may be used to clamp and fix the workpiece. In some embodiments, the clamper 302 may be rotationally connected to the movable seat 301, the movable seat 301 may be provided with a rotating motor 304 connected to the clamper 302, and the clamper 302 may be driven to rotate through the rotating motor 304.

In some embodiments, two ends of the workpiece may be fixed by clamping at two ends, which may improve the clamping effect of the workpiece.

In some embodiments, the clamper 302 may adopt a structure such as a chuck, the workpiece may be clamped through the chuck and the chuck may be driven to rotate through the rotating motor 304.

The movable seat may be used to mount, fix the clamper and other devices and drive them to move. In some embodiments, a bottom of the movable seat 301 may be provided with a movable mechanism 303 that drives the movable seat 301 to move.

The movable mechanism may be a mechanism used to drive components to move. In some embodiments, the movable mechanism 303 may adopt common linear moving mechanisms such as a ball screw moving mechanism and a gear rack moving mechanism, etc.

In some embodiments, the helical winding device 10, the circumferential winding device 20, and the fixing device 30 may be provided with a corresponding sensor, each sensor may be connected to a corresponding control system to perform automation control, so as to realize automation operation of the helical winding device 10, the circumferential winding device 20, and the fixing device 30.

In some embodiments, the control system may include a controller, a displacement sensor, and an angle sensor, and the displacement sensor and the angle sensor may communicate with the controller. The displacement sensor may measure the expansion and contraction of the multi-filar guide, and the angle sensor may measure the rotation of the multi-filar guide. The controller may receive detection information of the displacement sensor and the angle sensor and send a control instruction to the multi-filar guide to control the movement of the multi-filar guide accordingly based on processing the detection information.

In some embodiments, the control system may predict position of the multi-filar guide based on parameters of the workpiece, displacement information of the multi-filar guide, and angle information of the multi-filar guide. In some embodiments, the position of the multi-filar guide may be determined based on a prediction model, and the prediction model may be a machine learning model. An input of the prediction model may include the parameters of the workpiece, the displacement information and the angle information of the current and the previous (or a plurality of time points previous) of the multi-filar guide, and an output of the prediction model may include the position information of the subsequent (i.e., time points in the future) multi-filar guide.

In some embodiments, the control system may also determine a risk probability of unqualified winding based on the predicted position information of the multi-filar guide determined by the prediction model, and the unqualified winding may include filament winding stack, and uneven spacing between filaments, etc.

In some embodiments, the prediction model may include a feature layer, a sequence layer, and a first prediction layer. An input of the feature layer may include the parameters of the workpiece, and an output of the feature layer may be a feature vector of the workpiece. An input of the sequence layer may be the displacement information and the angle information of the current and previous (or a plurality of time points previous) multi-filar guide, and an output of the sequence layer may be a sequence feature of the position. An input of the first prediction layer may be the feature vector of the workpiece and the sequence feature of the position, and an output of the first prediction layer may be subsequent position information of the multi-filar guide. In some embodiments, the prediction model may also include a second prediction layer, an input of the second prediction layer may be the sequence feature of the position and the subsequent position information of the multi-filar guide output by the first prediction layer, and an output may be a risk probability of unqualified winding.

In some embodiments, the prediction model may be obtained from a plurality of first training samples and the labels. The first training sample may be the parameters of the sample workpiece, and the displacement information and the angle information of the sample multi-filar guide at a plurality of time point. The labels of the first training samples may be whether the sample winding is qualified and the position of the sample multi-filar guide at the time point sample after a plurality of time points. For example, a plurality of first training samples with labels may be input into an initial prediction model, a loss function may be constructed through the prediction results of the initial prediction model and the labels, the parameters of the initial prediction model may be updated based on the iterations of the loss function, and a training of the initial prediction model may be completed when the loss function of the initial prediction model satisfies a preset conditions The preset condition may include a convergence of the loss function, a number of the iterations that reaches a threshold, etc. In some embodiments, the first training samples may be obtained based on historical production data of the device.

In some embodiments, in response to determination that the risk probability of unqualified winding is larger than the threshold, the control system may send early warning information to remind manual adjustment. In some embodiments, the control system may also determine adjustment parameters of the multi-filar guide by an adjustment model and send the control instructions to the multi-filar guide based on the adjustment parameters.

In some embodiments, the adjustment model may be a machine learning model, and an input of which may be operating parameters of the multi-filar guide after adjustment, the parameters of the workpiece, displacement information and the angle information of the current and previous (or a plurality of time points previous) multi-filar guide, and an output of which is the risk probability of unqualified winding. The corresponding adjustment parameters that the risk probability of unqualified winding is less than the threshold may be generate to the control instructions.

In some embodiments, the adjustment model may be obtained from a second training samples and the labels. The second training sample may include the operating parameters of the sample multi-filar guide, the parameters of the sample workpiece, and the displacement information and angle information of the sample multi-filar guide at a plurality of time points. The labels of the second training samples may be whether the sample winding is qualified. In some embodiments, the second training sample may be obtained based on historical production data of the device.

The basic concepts have been described above, apparently, for those skilled in the art, the above-mentioned detailed disclosure is only used as an example, and it does not constitute a limitation of the present disclosure. Although there is no clear explanation here, those skilled in the art may make various modifications, improvements, and corrections for the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" mean that a certain feature, structure, or characteristic is connected to at least one embodiment of the present disclosure. Therefore, it should be emphasized and noted that two or more references of "an embodiment" or "one embodiment" or "an alternative embodiment" in various places in the present disclosure do not necessarily refer to the same embodiment. In addition, some characteristics, structures, or characteristics of one or more embodiments in this manual may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combinations that are within the spirit and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the expressions disclosed in the present disclosure and thus help the understanding of one or more embodiments of the invention, in the foregoing description of the embodiments of this specification, various features may sometimes be combined into one embodiment, drawings or descriptions thereof. However, this disclosure method does not mean that the characteristics required by the object of the present disclosure are more than the characteristics mentioned in the claims. Rather, claimed subject matter may lie in less than all features of a single foregoing disclosed embodiment.

Some embodiments use numbers with description ingredients and attributes. It should be understood that the number described by such examples is used in some examples with the modified words "about", "approximate" or "generally" to modify. Unless otherwise stated, "about", "approximate" or "generally" indicates that the number allows a change of ±20%. Correspondingly, in some embodiments, the value parameters used in the present disclosure and claims are approximate values. The approximate values may be changed according to the characteristics of individual embodiments. In some embodiments, the numerical parameters should consider the effective digits specified and use a general digit reservation method. Although in some embodiments of the present disclosure, the numerical domain and parameters used to confirm the range of its scope are approximate values, the setting of such values may be as precise as possible within the feasible range in specific embodiments.

For each patent, patent application, patent application publications and other materials cited by the present disclosure, such as articles, books, instructions, publications, documents, etc., all of them will be incorporated in the present disclosure as a reference. History application documents that are inconsistent or conflictive with the contents of the present disclosure are excluded, as well as documents (currently or subsequently appended to the present disclosure) limiting the broadest scope of the claims of the present specification. It should be noted that, if there is any inconsistency or conflict between the descriptions, definitions, and/or usage of terms in subsidiary information of the present disclosure and the contents of the present disclosure, the descriptions, definitions, and/or usage of terms in the present disclosure shall prevail.

Finally, it should be understood that the embodiments described in the present disclosure are only used to illustrate the principle of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Correspondingly, the embodiments of the present disclosure are not limited to the embodiments clearly introduced and described in the present disclosure.

What is claimed is:

1. A filament winding device, comprising a helical winding device, a circumferential winding device, and a fixing device, wherein
    a workpiece is clamped through the fixing device that drives the workpiece to rotate radially and move axially, the workpiece on the fixing device is performed helical winding through the helical winding device, and the workpiece on the fixing device is performed circumferential winding through the circumferential winding device;
    the helical winding device includes a frame body and a plurality of multi-filar guides, the frame body is provided with a second through-hole, the plurality of multi-filar guides distributed in a circumference along a center of the second through-hole are rotationally connected to the frame body, and filament is extended out from each multi-filar guide in the plurality of multi-filar guides;
    the frame body is provided with a first driving mechanism that drives each multi-filar guide to rotate;
    each multi-filar guide is rotationally connected to the frame body through a coupling sleeve, the coupling sleeve is rotationally connected to the frame body, and each multi-filar guide is slidably connected to the coupling sleeve;
    the first driving mechanism is connected to the coupling sleeve to drive each multi-filar guide to rotate;
    the helical winding device further includes a telescopic mechanism that drives each multi-filar guide to slide along the coupling sleeve;
    the circumferential winding device includes a frame, a fixing plate, a plurality of filament bundle cylinders, a bundle collecting device, and a guidewire component, the fixing plate is rotationally connected to the frame, and the fixing plate is connected to a driving element that drives the fixing plate to rotate;
    each filament bundle cylinder in the plurality of the filament bundle cylinders corresponds to a tension controller;
    a middle part of the fixing plate is provided with a first through-hole, and each filament bundle cylinder distributed in a circumference along a center of the first through-hole is rotationally connected to the fixing plate, and each tension controller is fixedly connected to the fixing plate;
    the fixing plate is provided with a plurality of winding rollers, each winding roller in the plurality of winding rollers is located outside of each filament bundle cylinder, and each winding roller distributed in the circumference along the center of the first through-hole is rotationally connected to the fixing plate; and
    the bundle collecting device and the guidewire component are fixed on the fixing plate, filament bundle wound on each filament bundle cylinder is extended out from the guidewire component after passing through a corresponding tension controller and a corresponding winding roller successively and converging by the bundle collecting device.

2. The device of claim 1, wherein the bundle collecting device includes a bracket and a guide plate, one end of the bracket is fixedly connected to the fixing plate and other end of the bracket is fixedly connected to the guide plate, and two ends of the guide plate are provided with guide gears respectively;
    an upper end of the guide plate is fixedly provided with a transition plate, which is provided with transition gears; and
    the filament is extended out from the guidewire component after passing through the transition gears and the guide gears successively.

3. The device of claim 1, wherein the guidewire component includes a guidewire frame and a pressure head, the guidewire frame is fixedly connected to the fixing plate, the pressure head is fixedly connected to the guidewire frame, and the filament bundle is extended from a gap between the pressure head and the guidewire frame.

4. The device of claim 1, wherein each multi-filar guide is a hollow rod with two openings at both ends, and the filament enters the hollow rod from an opening at one end and extends out from an opening at other end;
    a shape of the other end of the hollow rod is flat, and a shape of the other end is the same as a cross-section shape of the filament.

5. The device of claim 1, wherein the first driving mechanism includes a first driving element and a first gear transmission mechanism, and the first driving element is connected to each multi-filar guide through the first gear transmission mechanism to drive each multi-filar guide to rotate.

6. The device of claim 5 wherein the first gear transmission mechanism includes a first gear ring and a plurality of first connecting columns, the first gear ring is rotationally connected to the frame body, and the first driving element is connected to the first gear ring to drive the first gear ring to rotate;
    the plurality of first connecting columns are rotationally connected to the frame body, and each multi-filar guide is connected to a first connecting column in the plurality of first connecting columns; and
    the first connecting column is driven to rotate through rotation of the first gear ring, the first connecting column drives the multi-filar guide to rotate, one end of the first connecting column is provided with a first connecting gear meshing with the first gear ring, and other end of the first connecting column is provided with a first transmission gear meshing with a first driving gear on the multi-filar guide.

7. The device of claim 1, wherein the telescopic mechanism includes a plurality of shifting fork mechanisms and a second driving mechanism, wherein
- each multi-filar guide is connected to a shifting fork mechanism in the plurality of shifting fork mechanisms;
- the shifting fork mechanism includes a shifting fork and a guide rod, the guide rod is fixedly connected to the frame body, the shifting fork is slidably connected to the guide rod, and one end of the shifting fork is rotationally connected to the multi-filar guide; and
- the second driving mechanism is connected to the shifting fork to drive the shifting fork to slide along the guide rod.

8. The device of claim 7, wherein the second driving mechanism includes a second driving element, a second gear transmission mechanism, and a plurality of lead screw and nut mechanisms, wherein
- each shifting fork is connected to a lead screw and nut mechanism, one end of lead screw in the lead screw and nut mechanism is fixedly connected to the shifting fork, and nut in the lead screw and nut mechanism is rotationally connected to the frame body;
- the second gear transmission mechanism includes a second gear ring and a plurality of second connecting columns;
- the second gear ring is rotationally connected to the frame body, and the second gear ring is driven to rotate by the second driving element;
- the plurality of second connecting columns are rotationally connected to the frame body, and each lead screw and nut mechanism is connected to a second connecting column in the plurality of second connecting columns; and
- the second connecting column is driven to rotate through the rotation of the second gear ring, the second connecting column drives the multi-filar guide to expand and contract, one end of the second connecting column is provided with a second connecting gear meshing with the second gear ring, and other end of the second connecting column is provided with a second transmission gear meshing with outer gears of the nut.

9. The device of claim 1, wherein the fixing device includes a clamper and a movable seat, wherein
- the clamper is rotationally connected to the movable seat, the movable seat is provided with a rotating motor connected to the clamper, and the clamper is driven to rotate through the rotating motor; and
- a bottom of the movable seat is provided with a movable mechanism that drives the movable seat to move.

* * * * *